United States Patent
Yoshigahara et al.

(10) Patent No.: US 6,476,812 B1
(45) Date of Patent: Nov. 5, 2002

(54) INFORMATION PROCESSING SYSTEM, INFORMATION PROCESSING METHOD, AND SUPPLYING MEDIUM

(75) Inventors: Takayuki Yoshigahara, Tokyo; Atsushi Yokoyama, Kanagawa, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/451,569

(22) Filed: Nov. 30, 1999

(30) Foreign Application Priority Data

Dec. 9, 1998 (JP) .......................................... 10-349538

(51) Int. Cl.$^7$ ................................................ G06T 15/20
(52) U.S. Cl. ........................ 345/427; 345/473; 345/958; 463/31
(58) Field of Search ................................. 345/419, 473, 345/474, 475, 958, 427; 463/31

(56) References Cited

U.S. PATENT DOCUMENTS 5,973,704 A * 10/1999 Nishiumi et al.
6,115,045 A * 9/2000 Miyauchi
6,310,627 B1 * 10/2001 Sakaguchi

* cited by examiner

*Primary Examiner*—Mark Zimmerman
*Assistant Examiner*—Kimbinh T. Nguyen
(74) *Attorney, Agent, or Firm*—Bell, Boyd & Lloyd LLC

(57) ABSTRACT

An information processing system for processing three-dimensional information on an object existing actually in a three-dimensional space for detecting a collision between a space having an optional configuration and size in the three-dimensional space and the object. In the information processing system, a virtual space setting section sets a virtual space in the three-dimensional space, and a three-dimensional information creating section creates three-dimensional information on the object such as an intruder. A decision is made, on the basis of the three-dimensional information on the object, on whether or not the collision between the intruder and the virtual space occurs.

31 Claims, 24 Drawing Sheets

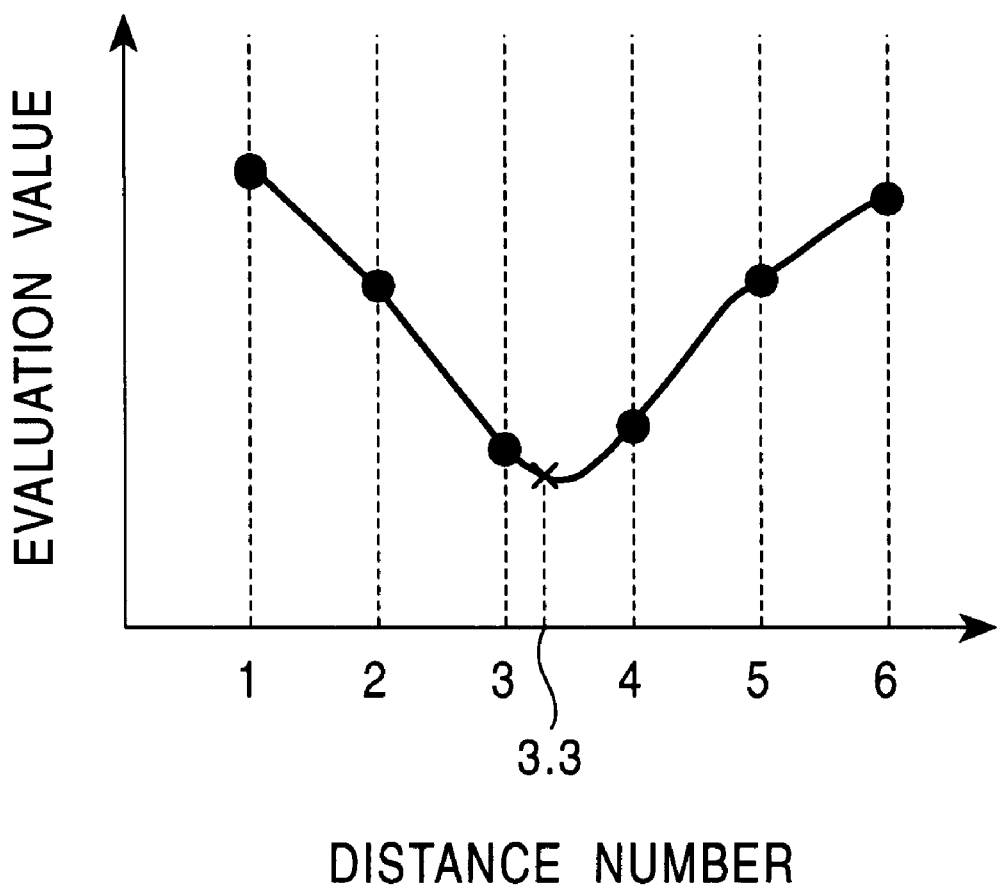

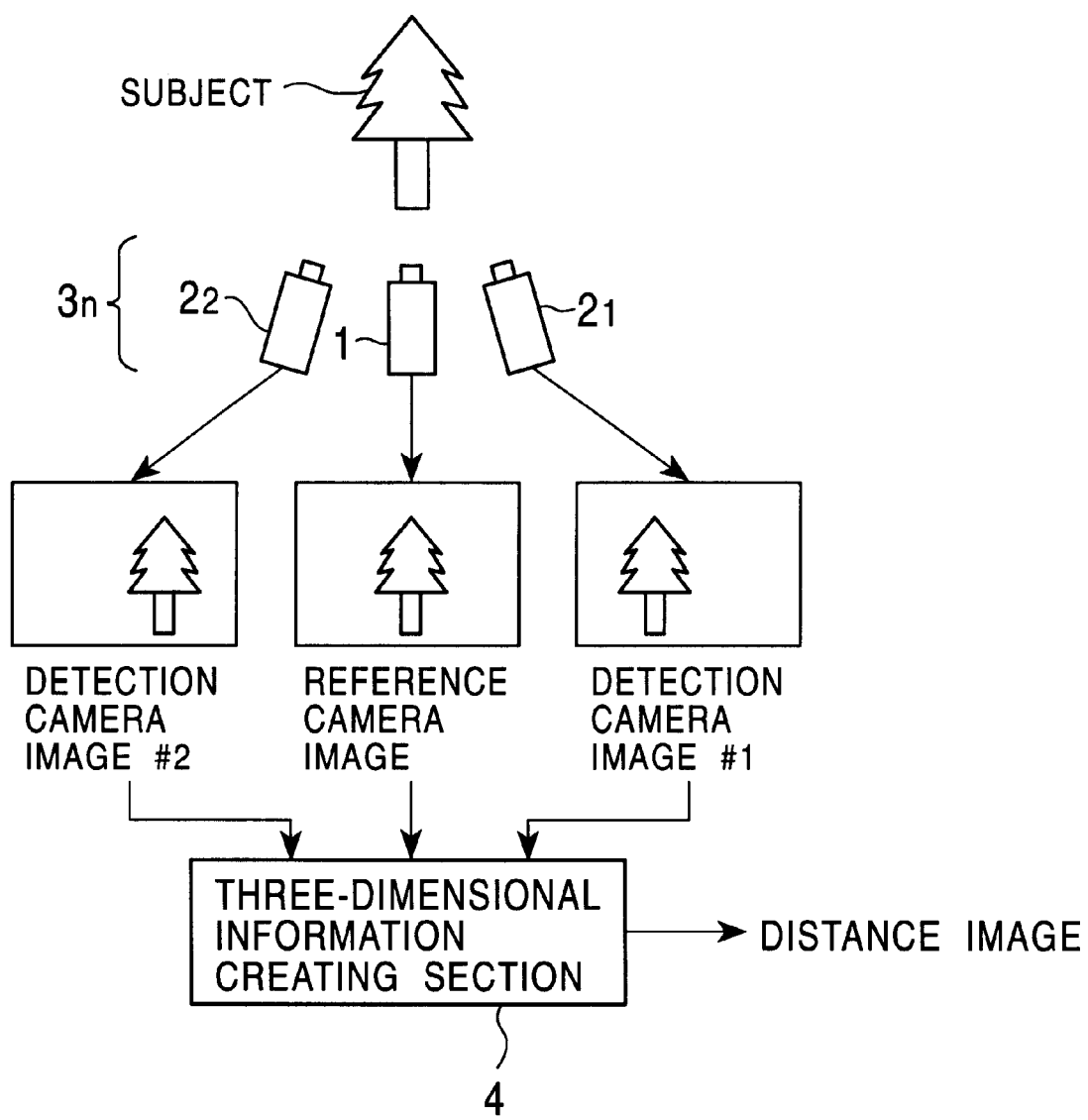

STEREO CAMERA SYSTEM
(CAMERA SETS 31 TO 3N + THREE-DIMENSIONAL INFORMATION CREATING SECTION 4)

▫ + ▪ : DISTANCE-MEASURABLE SPACE

▪ : VIRTUAL SPACE

▦ : INFRARED EMITTING SECTION

◍ : INFRARED RECEIVING SECTION

→ : EMISSION OF INFRARED RAY

⬚ : NO-INTRUSION ZONE

INFORMATION PROCESSING SYSTEM, INFORMATION PROCESSING METHOD, AND SUPPLYING MEDIUM

BACKGROUND OF THE INVENTION

1. Field of the Invention

The present invention relates to an information processing system, an information processing method, and a supplying (distribution) medium, and more particularly to an information processing system, an information processing method, and a supplying medium, capable of presenting various kinds of applications, for example, by detecting a collision between an optional or arbitrary space in a three-dimensional space and an object or body.

2. Description of the Related Art

As a method of detecting whether or not an object (including a thing, a person or the like) intrudes into or enters one space (or area) of a three-dimensional space, for example, there has been known an infrared detection system using infrared rays (in this case, the system signifies a logical set of a plurality of units irrespective of whether or not the units constituting the respective components exist in the same body of equipment.).

FIG. 24 shows a configuration example of an infrared detection system.

In FIG. 24, a shadowed rectangular area represents a no-intrusion zone (intrusion prohibited zone), where at four corner portions of the rectangular zone there are placed infrared emitting sections each emitting an infrared ray (in the illustration, indicated at shadowed squares) or infrared receiving sections each receiving an infrared ray (in the illustration, indicated by shadowed circles). Each of the infrared emitting sections emits an infrared ray as indicated by an arrow in FIG. 24, while the infrared receiving section existing at the end of that arrow receives the infrared ray emitted therefrom. Additionally, when the infrared receiving section cannot receive the infrared ray from the corresponding infrared emitting section, for example, an alarm is issued on the assumption that an intruder intercepts the infrared ray to invade into a no-intrusion zone.

Incidentally, among the infrared detection systems, there is a system in which infrared reflecting section are used in place of the infrared receiving sections and the infrared ray reflected by one of the infrared reflecting sections is received by the corresponding infrared emitting section.

Although, for organizing the infrared detection system shown in FIG. 24, there is a need to present a place installing infrared emitting sections and infrared receiving sections (or infrared reflecting sections), that location depends upon the configuration of the no-entry zone and others. For this reason, a place to which many people gain access sometimes has difficulty in the installation of the infrared emitting sections and the infrared receiving sections.

In addition, since the infrared ray advances straight from the infrared emitting section to the infrared receiving section, in the case in which it is desirable that the no-entry zone has a curve (or a curved plane) at its boundary, there is a need to install a number of sets comprising the infrared emitting sections and the infrared receiving sections along that curve, and if the configuration is further complicated, difficulty can be encountered in meeting the requirements.

Meanwhile, for example, there has been known a method in which an image taken through a video camera is processed for image recognition to detect the existence of an object within a field of view of the video camera. In this method, of the images outputted in time series from the video camera, the images adjacent to each other on the time axis are compared with each other to detect a moving object, or each of the images outputted in time series from the video camera is compared with a previously taken image to detect a scene differing from the previously taken image.

Accordingly, this method can detect the intrusion of an object into a field of view of a camera, but cannot detect whether or not an object intrudes into a certain space within the field of view of the camera.

SUMMARY OF THE INVENTION

Accordingly, the present invention has been developed in consideration of these situations, and it is an object of the invention to detect a collision between an optional space in a three-dimensional space and an object.

For this purpose, in accordance with this invention, there is provided an information processing system for processing three-dimensional information on an object existing in a three-dimensional space, comprising setting means for setting a predetermined virtual space in the three-dimensional space, creating means for creating the three-dimensional information on the object, and judging means for making a decision, on the basis of the three-dimensional information on the object, on whether or not a collision between the object and the virtual space occurs.

Furthermore, in accordance with this invention, there is provided an information processing method of processing three-dimensional information on an object existing in a three-dimensional space, the method comprising a setting step of setting a predetermined virtual space in the three-dimensional space, a creating step of creating three-dimensional information on the object, and a judging step of making a decision, on the basis of the three-dimensional information on the object, as to whether or not a collision between the object and the virtual space occurs.

Still furthermore, in accordance with this invention, there is provided a supply medium for supplying control information which causes an information processing system to process three-dimensional information on an object existing in a three-dimensional space, the medium supplying a setting instruction for setting a predetermining virtual space in the three-dimensional space, a creating instruction for creating three-dimensional information on the object, and a judging instruction for making a decision, on the basis of the three-dimensional information on the object, as to whether or not a collision between the object and the virtual space occurs.

BRIEF DESCRIPTION OF THE DRAWINGS

The object and features of the present invention will become more readily apparent from the following detailed description of the preferred embodiments taken in conjunction with the accompanying drawings in which:

FIG. 6 is an illustration of a transition of an evaluation value;

FIG. 7 is an illustration useful for describing a multi baseline stereo method;

DESCRIPTION OF THE PREFERRED EMBODIMENTS

Figure 1:
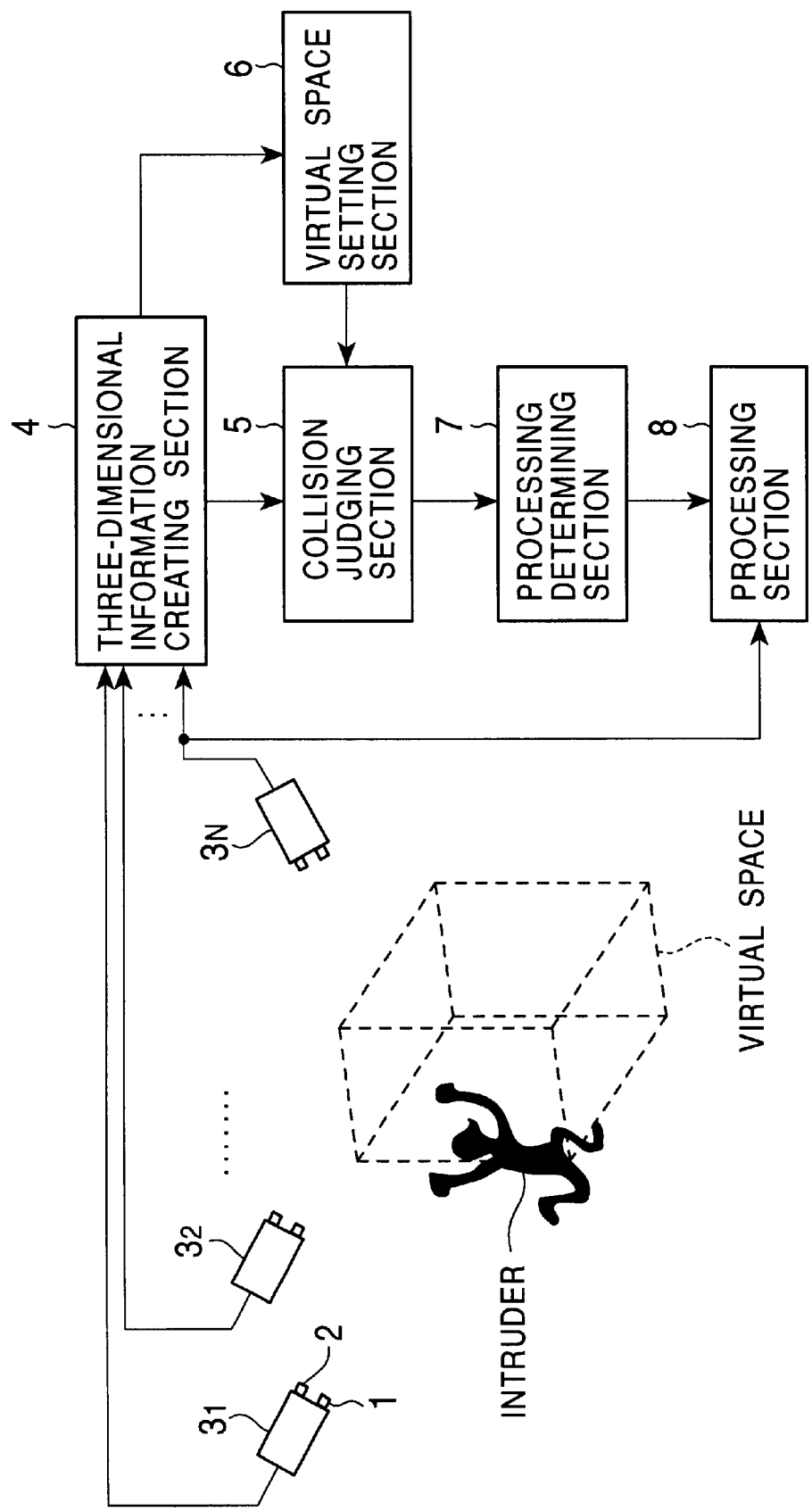
FIG. 1 is a block diagram showing a constructional example of a spatial collision judging system according to an embodiment of this invention.

FIG. 1 is an illustration of a configurational example of a spatial collision judging system according to an embodiment of the present invention.

This spatial collision judging system is designed to make a decision on whether or not a collision between a virtual space set in a three-dimensional space and an actual object occurs, thereby detecting the intrusion of an object such as an intruder into the interior of the virtual space.

That is, each of N (an integer equal to or more than 1) camera sets $3_1$ to $3_N$ is composed of one reference camera 1 and one detection camera (access camera) 2 for photographing a three-dimensional space including a virtual space to supply the resultant image or picture to a three-dimensional information creating section 4. In this case, even if one set of the camera sets $3_1$ to $3_N$ is put to use, this system will do. However, if this system uses one set (N=1), since there is a possibility that, even if an intruder exists, there exists a portion in which difficulty is encountered in photographing that intruder (a portion which disappears from one camera set). Accordingly, if the circumstances or purposes do not tolerate the occurrence of such a partial invisibility, it is preferable that a plurality of camera sets $3_1$ to $3_N$ (N=2 or more) are located at different view points.

The three-dimensional information creating section 4 uses an image (reference camera image) outputted from the reference camera 1 constituting the camera set $3_n$ (n=1, 2, . . . , N) and an image (detection camera image) outputted from the detection camera 2 to conduct the so-called stereo processing for creating three-dimensional information indicative of a distance from one reference point with respect to one object (for example, a desk, a chair, a wall, a floor, a person, an animal, and others) existing within a three-dimensional space, with this three-dimensional information being supplied to a collision judging section 5. Additionally, the three-dimensional information creating section 4 supplies the three-dimensional information on (related to) the object within the three-dimensional space to a virtual space setting section 6, when needed. In this case, the reference camera 1 and the detection camera 2 are made up of a CCD (Charge Coupled Device) video camera or the like.

The collision judging section 5 makes a decision, on the basis of the three-dimensional information on the object from the three-dimensional information creating section 4, as to whether the virtual space in the three-dimensional space set by the virtual space setting section 6 and the object within the three-dimensional space collide with each other, and gives the decision result to a processing determining section 7. That is, when detecting the collision between the object and the virtual space, the collision judging section 5 supplies a collision detection signal representative of the fact of the collision therebetween to the processing determining section 7.

The virtual space setting section 6 is made to set a virtual space within a three-dimensional space in accordance with an operation by the user or on the basis of the three-dimensional information from the three-dimensional information creating section 4. That is, for example, the virtual space setting section 6 is made to produce three-dimensional information defining a virtual space set within a three-dimensional space and to supply it to the collision judging section 5.

In this instance, the three-dimensional information describing the virtual space is not particularly limited as long as it can singly determine the configuration, volume of the virtual space and the position thereof within a three-dimensional space. For example, if the virtual space is a rectangular parallelepiped, a sphere or the like forming a primitive figure, then the vertical length, horizontal length, height of this configuration, the positions of some summits thereof within a three-dimensional space, the radius thereof, position of the center thereof within the three-dimensional space, and others can be used as the three-dimensional information defining the virtual space. Additionally, it is also appropriate that, for example, the virtual space is approximated to a polygon, a Bezier curved surface or the like and the information about the polygon or the Bezier curved surface (summits or the like defining the polygon or Bezier curved surface) is used as the three-dimensional information on the virtual space.

The virtual space setting section 6 incorporates a hard disk and a memory (both not shown) to put the created three-dimensional information on the virtual space therein.

In addition, as the virtual space setting section 6, it is also possible to employ a device such as a three-dimensional CAD (Computer Aided Design) which can easily draw three-dimensional graphics. In this case, the user can set a desired virtual space easily.

When receiving, from the collision judging section 5, the collision detection signal forming the judgment result showing the collision between the virtual space and the object within the three-dimensional space, the processing determining section 7 determines the processing to be conducted in the following processing section 8 and controls the processing section 8. The processing section 8 (processing means) conducts predetermined processing under control by the processing determining section 7.

Figure 2:
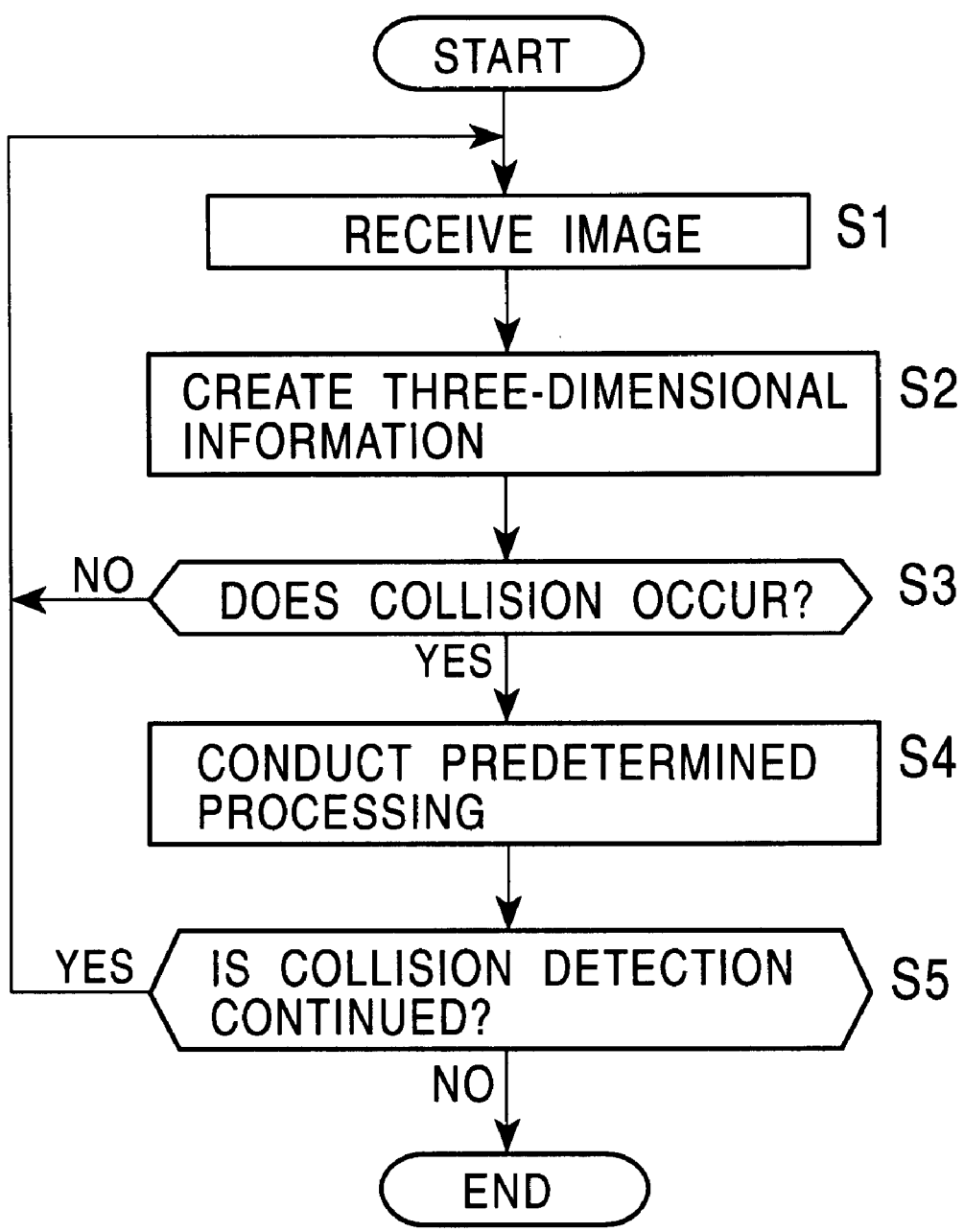
FIG. 2 is a flow chart useful for describing an operation of the spatial collision judging system shown in FIG. 1.

Secondly, an operation will be described hereinbelow with the flow chart of FIG. 2.

In the virtual space setting section 6, a virtual space having a rectangular parallelepiped is set as indicated by a dotted line in FIG. 1, and the three-dimensional information on this virtual space is given to the collision judging section 5.

Meanwhile, the three-dimensional space including the virtual space is photographed by each of the camera sets $3_1$ to $3_N$ and the resultant images (reference camera image and detection camera image) are supplied to the three-dimensional information creating section 4. In the three-dimensional; information creating section 4, a step S1 is first implemented to receive the image from each of the camera sets $3_1$ to $3_N$, then followed by a step S2 to create three-dimensional information on the object within the three-dimensional space on the basis of these images. This three-dimensional information on the object is led to the collision judging section 5.

In the collision judging section 5, a step S3 is implemented to made a decision, on the basis of the three-dimensional information on the object from the three-dimensional information creating section 4, as to whether or not the virtual space and the object within three-dimensional space occurs. If the decision of the step S3 shows no collision between the virtual space and the object, after the image of the next frame comes from each of the camera sets $3_1$ to $3_N$, the operational flow returns to the step S1 to conduct the same processing from the step S1 repeatedly.

On the other hand, if the decision of the step S3 indicates the occurrence of the collision between the virtual space and the object, the collision judging section 5 outputs a collision detection signal indicative of the fact of the collision to the processing determining section 7. Following this, the operational flow proceeds to a step S4 to determine the processing to be conducted in the processing determining section 7 and to control the processing section 8. Accordingly, the processing section 8 conducts the processing under control by the processing determining section 7. That is, for example, the processing section is a warning device, and when receiving the collision detection signal, the processing determining section 7 controls the processing section 8 to issue an alarm. In this case, the processing section 8 issue an alarm to inform that an intruder exists in the virtual space. Alternatively, the processing section 8 is constructed, for example, as a recording unit such as a VTR (Video Tape Recorder), and when receiving the collision detection signal, the processing determining section 7 controls the processing section 8 to start the recording operation. In this case, the processing section 8 records an intruder who exists in the virtual space. In this case, the image taken by at least one of the camera sets $3_1$, to $3_N$ is supplied to the processing section 8 to be recorded therein. Additionally, it is also possible to install a video camera dedicated to the recording in the processing section 8.

Figure 3:
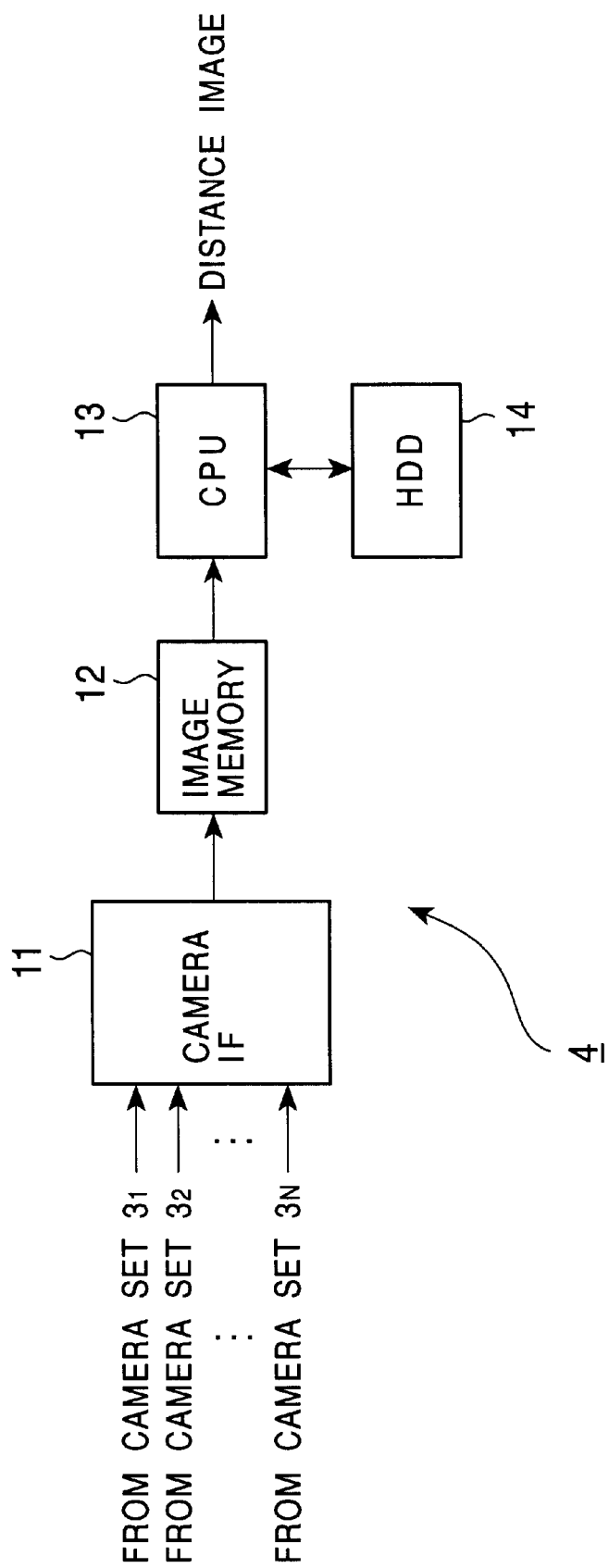
FIG. 3 is a block diagram showing a constructional example of a three-dimensional information creating section shown in FIG. 1.

FIG. 3 shows a configurational example of the three-dimensional information creating section 4 shown in FIG. 1.

An image from the camera set $3_n$ is received by a camera IF (Interface) 11 and converted into a digital signal, before being supplied to an image memory 12. The image memory 12 stores image data from the camera IF 11 in units of frames and supplies it to a CPU 13. The CPU 13 implements a program stored in a hard disk, an HDD (Hard Disk Drive) 14 incorporates, to conduct stereo processing through the use of the image stored in the image memory 12 for obtaining the distance from one reference point to each of points of the object in a three-dimensional space, with a distance image formed by using these distances as pixel values being produced and outputted as the three-dimensional information on the object.

The three-dimensional information creating section 4 conducts the stereo processing on the images (reference camera image and detection camera image) from each of the camera sets $3_1$, to $3_N$. Accordingly, if the number N of the camera sets $3_1$ to $3_N$ and their locations are appropriate, it is possible to prevent the invisibility of a part of an object within a three-dimensional space and to obtain the distances on the entire external configuration of an object.

Furthermore, a description will be given hereinbelow of the stereo processing the CPU 12 in FIG. 3 conducts.

The stereo processing is for making a correspondence (correlation) among the pixels of a plurality of images taken by photographing the same subject in two or more photographing directions (lines of sight) through the use of cameras to obtain the parallax between the corresponding pixels, the distance from the camera to the subject and the configuration of the subject.

Concretely, for example, if a subject is photographed by the use of the reference camera 1 and the detection camera 2 of one of the camera sets $3_1$ to $3_N$, the reference camera 1 presents a reference camera image including a subject image, while the detection camera 2 provides a detection camera image including a subject image. Now, let it be assumed that one point P on an object appears both the reference camera image and detection camera image as shown in FIG. 4, the parallax between the reference camera 1 and the detection camera 2 is obtainable on the basis of the position on the reference camera image at which this point P appears and the position on the detection camera image at which it appears, that is, the corresponding points, and the position (three-dimensional position) of the point P in a three-dimensional space is obtainable according to the principle of the tigonometrical survey.

Thus, the stereo processing first requires the detection of the corresponding points, and the corresponding point detecting methods include an area base matching method based upon an epipolar line.

Figure 4:
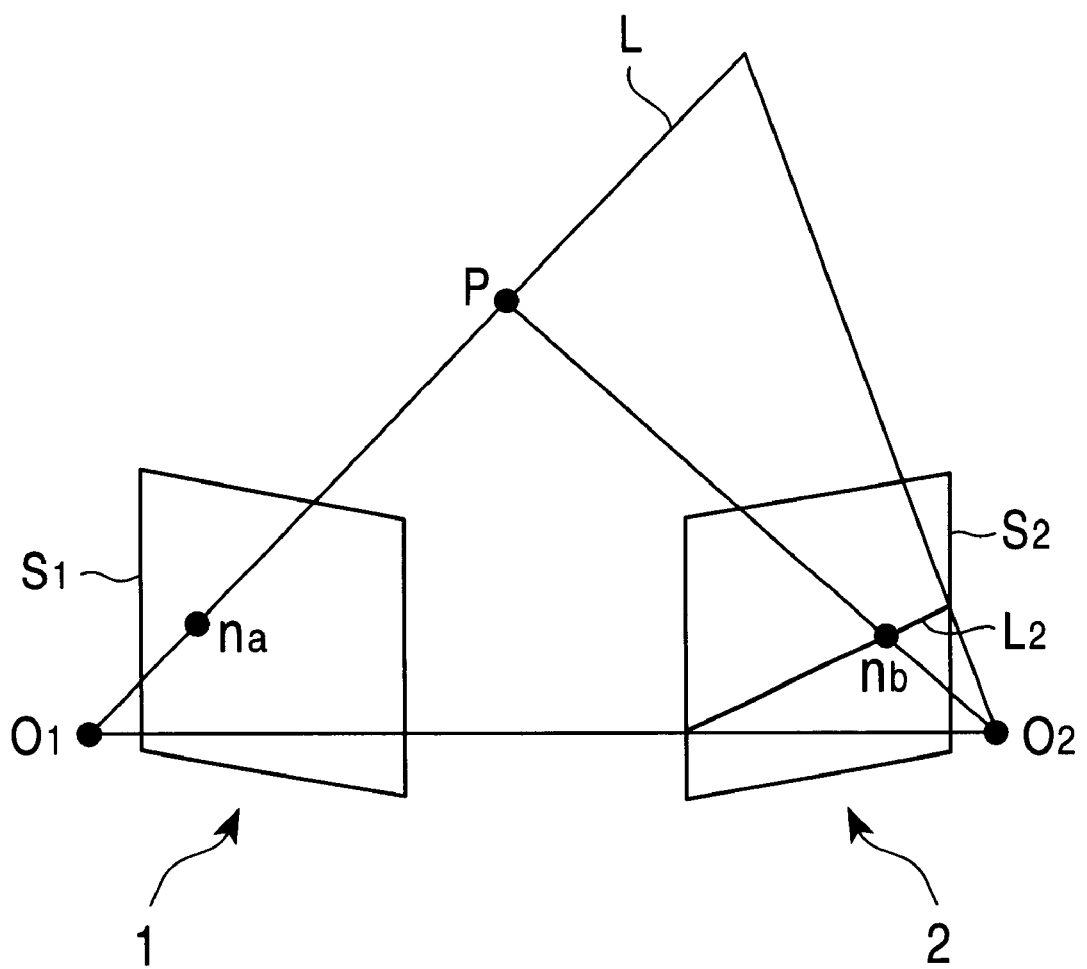
FIG. 4 is an illustration useful for describing an epipolar line.

Concretely, in the case of the reference camera 1, as shown in FIG. 4, the point P on the object is projected on the intersection n. of the straight line L connecting the point P and the optical center (center of the lens) $O_1$ of the reference camera 1 and an image pickup plane $S_1$ of the reference camera 1.

On the other hand, in the case of the detection camera 2, the point P on the object is projected on the intersection $n_b$ of the straight line connecting the point P and the optical center (center of the lens) $O_2$ and an image pickup plane $S_2$ of the detection camera 2.

In this case, the straight line L is projected on the image pickup plane $S_2$, forming the detection camera image thereon, as a crossing line $L_2$ between a plane passing through the optical centers $O_1$ and $O_2$ and the point $n_a$ (or the point P) and the image pickup plane $S_2$. The point P is a point on the straight line L and, hence, in the image pickup plane $S_2$, the point $n_b$ forming the projection of the point P exists on the straight line $L_2$ forming the projection of the straight line L, and this straight line $L_2$ is referred to as an epipolar line. That is, there is a possibility that the point $n_b$ corresponding to the point $n_a$ exists on the epipolar line $L_2$, and the search of the corresponding point $n_b$ may be made on the epipolar line $L_2$.

In this case, for example, although the epipolar line can be considered at every pixel constituting the reference camera image formed on the image pickup plane $S_1$, if the positional relationship between reference camera 1 and the detection camera 2 is known, the epipolar line existing at every pixel is obtainable in advance.

For example, the detection of the corresponding point $n_b$ from a point on the epipolar line $L_2$ can be made by the following area base matching technique.

Figure 5A:
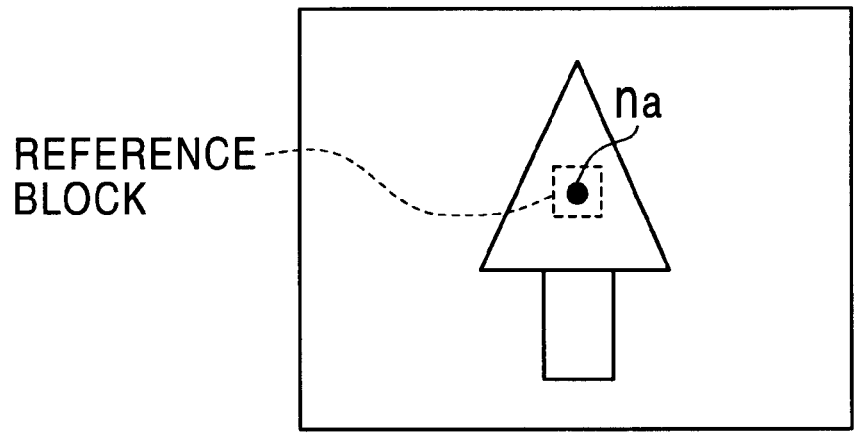
FIGS. 5A and 5B are illustrations of a reference camera image and a detection camera image.
Figure 5B:
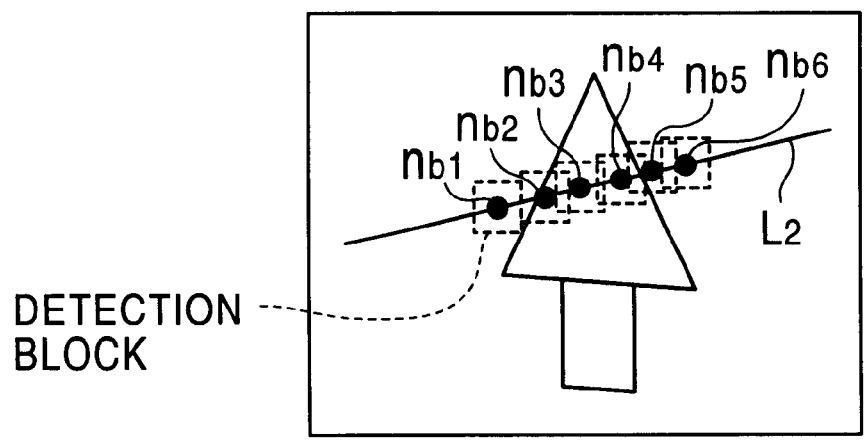

That is, in the area base matching technique, as shown in FIG. 5A, a reference block forming, for example, a small rectangular block and made in a state where the point $n_a$ on the reference camera image constitutes its center (for example, the intersection of the diagonal lines) is taken out from the reference camera image, and as shown in FIG. 5B, a detection block forming a small block equal in size to the reference block and made in a state where one point on the epipolar line $L_2$ projected on the detection camera image organizes its center is derived from the detection camera image.

In FIG. 5B, six points $n_{b1}$ to $n_{b6}$ forming the centers of the detection blocks are provided on the epipolar line $L_2$. These six points $n_{b1}$ to $n_{b6}$ form points on the straight line L in the three-dimensional space shown in FIG. 4, and are the points obtained by projecting the points, whose distances from a reference point are, for example, at 1m, 2m, 3, 4m, 5m and 6m, on the image pickup plane $S_2$ of the detection camera 2. Accordingly, these six points $n_{b1}$ to $n_{b6}$ correspond respectively to the points whose distances from the reference point are at 1m, 2m, 3m, 4m, 5m and 6m.

In the area base matching method, the detection blocks made in a state where the points $n_{b1}$ to $n_{b6}$ provided on the epipolar line $L_2$ constitute their centers are taken out from the detection camera image, and the correlation between each of the detection blocks and a reference block is calculated using a predetermined evaluation (or performance) function. Additionally, the center $n_b$ of the detection block showing the highest correlation with the reference block whose center is made as the point $n_a$ is obtained as a point corresponding to the point $n_a$.

In this case, as the evaluation function for evaluating the correlation between the reference block and the detection block, it is possible to use the sum total of the absolute values of the differences between the pixels constituting the reference block and the corresponding pixels constituting the detection block, the sum of the squares of the differences between the pixel values, the normalized cross correlation, or the like.

Assuming that the sum total of the absolute values of the differences between the pixel values is used as the evaluation function, the correlation between a predetermined point (x, y) (the pixel on the coordinate (x, y)) on the reference camera image and one point (x', y') on the detection camera image can be evaluated by an-evaluation value (error value) e(x, y) expressed by the following equation.

$$e(x, y) = \sum_{i,j \in W} |Y_A(x+i, y+j) - Y_B(x'+i, y'+j)| \quad (1)$$

where e(x, y) represents an evaluation value (error value) indicating the correlation between a pixel (x, y) on the reference camera image and a pixel (x', y') on the detection camera image;

$Y_A$(x+i, y+j) represents for example, a luminance which is a pixel value a point (x+i, y+j) on the reference camera image;

$Y_B$(x'+i, y'+j) denotes for example, a luminance which is a pixel value a point (x'+i, y'+j) on the detection camera image;

W denotes a reference block and a detection block; and i, j∈W depicts that the point (x+i, y+j) or the point (x'+i, y'+j) is a point (pixel) in the reference block or the detection block.

The evaluation value e(x, y) given by the equation (1) becomes smaller as the correlation between the pixel (x, y) on the reference camera image and the pixel (x', y') on the detection camera image increases; therefore, the pixel (x', y') on the detection camera image which makes the evaluation value e(x, y) become the smallest is obtained as a point corresponding to the pixel (x, y) on the reference camera image.

In the case of the use of the evaluation value which becomes smaller in accordance with the increase in correlation as expressed by the equation (1), let it be assumed that, for example, evaluation values (the values of the evaluation function) shown in FIG. 6 are obtained at the points $n_{b1}$ to $n_{b6}$ on the epipolar line $L_2$, respectively. In FIG. 6, the horizontal axis represents the distance numbers signifying the distances from a reference point and previously given respectively to points in a three-dimensional space corresponding to the points $n_{b1}$ to $n_{b6}$, while the vertical axis represents the evaluation values for the respective distance numbers (the points $n_{b1}$ to $n_{b6}$ on the epipolar line $L_2$).

In the case of the evaluation curve comprising the evaluation values shown in FIG. 6, the point on the epipolar line $L_2$ corresponding to the distance number 3 corresponding to the smallest evaluation value (the highest correlation) is detected as the corresponding point of the point $n_a$. In addition, it is also appropriate that an interpolation is made using the values close to the smallest value of the evaluation values (indicated at black circles in FIG. 6) calculated at the points respectively corresponding to the distance numbers 1 to 6 in FIG. 6 to obtain the point at which the evaluation value becomes smaller (the point corresponding to 3.3 m as indicated by a mark x in FIG. 6) so that this point is detected as the final corresponding point.

For example, the setting of the points $n_{b1}$ to $n_{b6}$ obtained by projecting, on the image pickup plane $S_2$ of the detection camera 2, the points on the straight line L connecting the point $n_a$ on the image pickup plane $S_1$ of the reference camera 1 and its optical center $O_1$ can be made at the calibration of the reference camera 1 and the detection camera 2 (limitation is not particularly imposed on the calibration method). Additionally, if such setting is conducted for each epipolar line existing at every pixel constituting the image pickup plane $S_1$ of the reference camera 1 and further a distance number/distance table which defines the correspondence between the distance numbers corresponding to the distances (the distances from a reference point) to the points (which will be referred to hereinafter as set points) set on the epipolar line and the distances from the reference point is drawn up in advance, the distance from the reference point (an estimated value of the distance to a point on an object) is immediately obtainable in a manner that the set point forming the corresponding point is detected and the distance number corresponding to the detected set point is translated by reference to the distance number/distance table. That is, in a word, the distance is directly obtainable on the basis of the corresponding point.

For example, in the case in which the position of the reference camera 1 is employed as the reference point and the distance is found directly from the corresponding point, the adjacent set points on the epipolar line corresponding to remoter points in a three-dimensional space lie at a smaller interval. Accordingly, when the interval (separation) between the adjacent set points is shorter than the distance between the pixels of the detection camera image, the precision of the distances obtained lowers at these points. However, if the setting of the set point or the detection of the corresponding point is made in unit of sub-pixel smaller than the pixel, the problem on the precision is solvable.

Furthermore, the use of the blocks, namely, the reference block and the detection block, comprising a plurality of pixels for the detection of the corresponding point is for reducing the influence of noise, while the utilization of the correlation between the feature of the pixel pattern around the pixel (point) $n_a$ on the reference camera image and the feature of the pixel pattern around the corresponding point (pixel) $n_b$ on the detection camera image is for detecting the corresponding point surely.

Still furthermore, in the aforesaid case, although one reference camera 1 and one detection camera 2 are put to use, it is also possible that, as shown in FIG. 7, the camera set $3_n$ is composed of one reference camera and a plurality of detection cameras, for example, two detection cameras $2_1$, and $2_2$, and in the three-dimensional information creating section 4, an evaluation value is found according to the multi baseline stereo method and the distance is obtained on the basis of that evaluation value, that is, the distance image is attained according to the so-called multiple-lens stereo processing.

The multi baseline stereo method uses one reference camera image and a plurality of detection camera images to obtain an evaluation value indicative of the correlation between each of the plurality of detection camera images and the reference camera image (in the case of FIG. 7, an evaluation value representative of the correlation between one observed pixel on the reference camera image outputted from the reference camera 1 and the pixel on the detection camera image #1 outputted from the detection camera $2_1$, and an evaluation value representative of the correlation between the observed pixel on the reference camera image and the pixel on the detection camera image #2 outputted from the detection camera $2_2$) and to add the evaluation values at the same distance number so that the addition result is used as the final evaluation value, thus offering a high-precision distance. For example, the detail is disclosed in "Stereo Matching Using a Plurality of Baseline Lengths" (Electronic Information Communication Academy Paper D-II Vol. J75-D-II No. 8 pp. 1317–1327, August, 1992) written by Masatoshi Okutomi and Takeo Kanade. This multi baseline stereo method is particularly effective, for example, in the case in which the reference camera image and the detection camera images have a repeated pattern.

Figure 8:
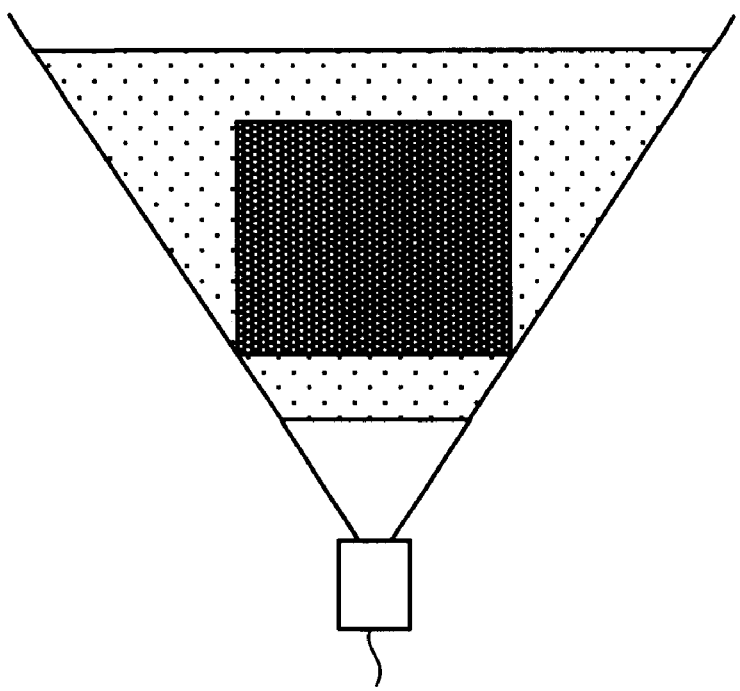
FIG. 8 is an illustration of the relationship between the fields of view of a reference camera and detection camera and a virtual space.

In the three-dimensional information creating section 4, if the field of view of the detection camera 2 coincides with the field of view of the reference camera 1, the distance is obtainable over the entire field of view of the reference camera 1. However, in the spatial collision judging system shown in FIG. 1, additionally, it is required that, as shown in FIG. 8, the reference camera 1 and the detection camera 2 be installed so that a virtual space (shadowed portion in the illustration) is included in the range in which the three-dimensional information creating section 4 can obtain the distance.

Figure 9:
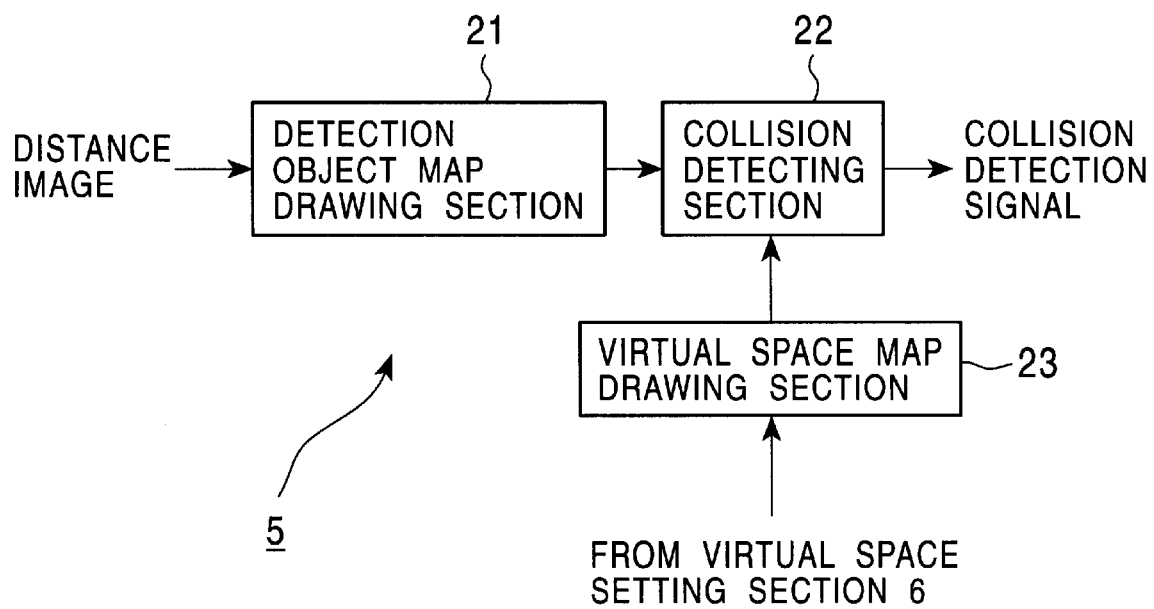
FIG. 9 is a block diagram showing a constructional example of a collision judging section shown in FIG. 1.

FIG. 9 shows a configurational example of the collision judging section 5 shown in FIG. 1.

A distance image forming three-dimensional information on an object created in the three-dimensional information creating section 4 is made to enter a detection object map drawing section 21. The detection object map creating section 21 makes out an object map showing a position of the object in a three-dimensional space through the use of a predetermined three-dimensional coordinate system (which will be referred to hereinafter as a reference coordinate system, when needed) on the basis of the distance image from the three-dimensional information producing section 4, and supplies the object map to a collision detecting section 22.

The collision detecting section 22 makes a decision (detection), on the basis of the object map from the detection object map drawing section 21 and a virtual space map from a virtual space map drawing section 23, as to whether the object existing actually in the three-dimensional space collides against the virtual space and, if the collision occurs, outputs a collision detection signal representative of the fact of the collision therebetween to the processing determining section 7.

To the virtual space map drawing section 23, there is given three-dimensional information on the virtual space set in the virtual space setting section 6. The virtual space map drawing section 23 makes out, on the basis of the three-dimensional information on the virtual space from the virtual space setting section 6, a virtual space map indicating the position existing actually in that virtual space in the three-dimensional space through the use of the aforesaid reference coordinate system, and supplies it to the collision detecting section 22.

Furthermore, referring to FIG. 10, a description will be made hereinbelow of a decision algorithm to be used for making a decision on whether or not a collision occurs between a virtual space map and an object map drawn in the collision judging section 5 and between an object and a virtual space.

Now, assuming that the reference coordinate system is defined an x-axis, a y-axis and a z-axis perpendicular to each other in a state where one point in a three-dimensional space (for instance, the reference point used for when a distance is found in the three-dimensional information creating section 4) is taken as the origin, the detection object map drawing section 21 supposes the object on the reference coordinate system using a scale and a position coinciding with that reference coordinate system on the basis of the three-dimensional information on the object. Additionally, the detection object map drawing section 21 supposes rectangular parallelepipeds each having a predetermined size (for example, a cube having a dimension in which each of its length, width and height assumes 1 cm) (which will be referred to hereinafter as a box cell which signifies a cell with a box-like configuration) on the reference coordinate system, and judges whether each of the box cells is inside or outside the supposed object on the reference coordinate system (quantizes the object with the box cells. Still additionally, the detection object map drawing section 21 makes a correspondence between each of the box cells positioned inside or outside the object and, for example, "1" or "0", and outputs them as an object map.

Figure 10:
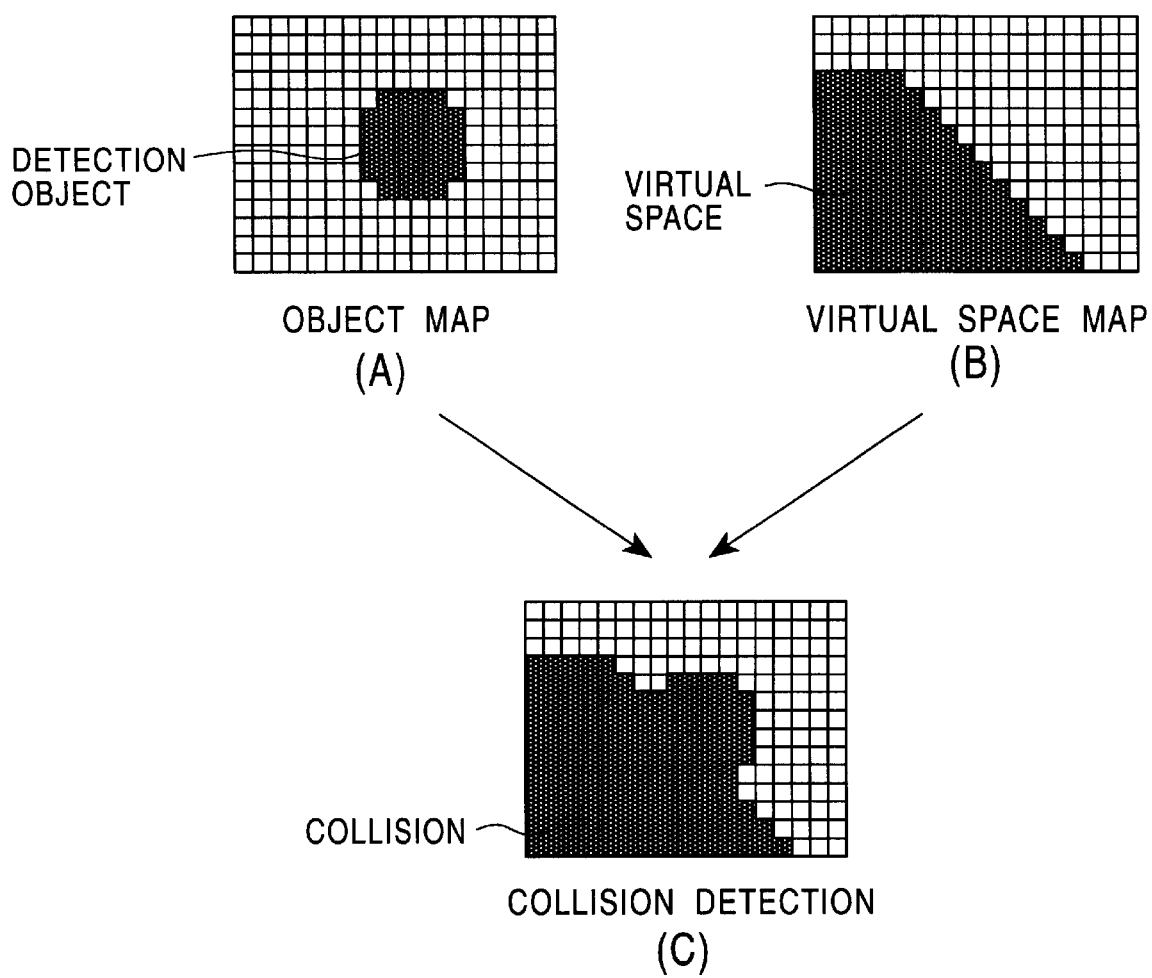
FIG. 10 is an illustration of an object map and a virtual space map.

In FIG. 10, (A) shows an object map in the case in which the reference coordinate system is cut along a plane parallel with an x-y plane. In (A) of FIG. 10, the shadowed portions signify the box cells corresponding to "1", while the non-shadowed portions represent the box cells corresponding to "0".

Also in the virtual space map drawing section 23, a virtual space map is drawn as well as the detection object map drawing section 21. That is, the virtual space map drawing section 23 supposes a virtual space on the reference coordinate system using the scale and the position set to those of that reference coordinate system on the basis of the three-dimensional information on the virtual space. Additionally, the virtual space map drawing section 23 supposes box cells on the reference coordinate system to make decision on whether each of the box cells is positioned inside or outside the virtual space supposed on the reference coordinate system (to quantize the object with the box cells). Still additionally, the virtual space map drawing section 23 establishes a correspondence between the box cell positioned inside or outside the virtual space and, for example, "1" or "0", and outputs the resultant as a virtual space map.

In FIG. 10, (B) shows a virtual space map in the case in which the reference coordinate system is cut along one plane parallel with the x-y plane. Also in (B) of FIG. 10, the shadowed portions signify the box cells corresponding to "1", while the non-shadowed portions signify the box cells corresponding to "0".

The object map and the virtual space map are produced in a state where their scales and positions are set according to the reference coordinate system and, hence, as shown in (C) of FIG. 10, when the object map shown in (A) of FIG. 10 and the virtual spacer map shown in (B) of FIG. 10 are put together in a state where the corresponding box cells coincide with each other, if the box cell indicative of the interior of the object in the object map and the box cell indicative of the interior of the virtual space in the virtual space map lie one upon another, this means that the collision between the object and virtual space occurs there. Accordingly, the decision on whether or not the object and the virtual space collide against each other can be made in accordance with whether or not the box cells lie one upon another as mentioned above. In this case, in (C) of FIG. 10, the strongly shadowed portions represent the overlap between the box cells representative of the interior of the object and the box cells representative of the interior of the virtual space.

Incidentally, in the case in which the decision on the occurrence/no occurrence of the collision between the object and the virtual space is made on the basis of the overlap between the box cells, it is also possible to recognize the position of the collision between the object and the virtual space in the three-dimensional space and the degree of the collision (that is, the degree of the intrusion of the object into the virtual space) on the basis of the position, on the reference coordinate system, of the overlap between the box cells representative of the interiors of the object and the virtual space and the number of box cells overlapping with each other.

The configuration and size of the box cell are not particularly limited. However, for example, for obtain accurately the position of the collision between the object and the virtual space in the three-dimensional space and the degree of the collision therebetween, it is preferable that the box cell has a smaller size. On the other hand, in view of reducing the processing, the larger box cell is more preferable. Accordingly, the size of the box cell is appropriately determined in consideration of these situations.

Referring further to the flow chart of FIG. 11, a description will be given hereinbelow of the operation of the collision judging section 5 shown in FIG. 9.

First of all, in a step S11, the virtual space map drawing section 23 receives the three-dimensional information on the virtual space from the virtual space setting section 6, and in the next step S12, it makes out a virtual space map on the basis of the three-dimensional information therefrom.

Meanwhile, the detection object map drawing section 21, in a step S13, receives the three-dimensional information on the object from the three-dimensional information creating section 4, and in the next step S14, it makes out an object map on the basis of the three-dimensional information therefrom.

The object map and the virtual space map made in the detection object map drawing section 21 and in the virtual space map drawing section 23 are both supplied to the collision detecting section 22.

In this case, the object map and the virtual space map are made using the same number of box cells, and the number is expressed by I. Additionally, in the object map or the virtual space map, the values set to correspond to the ith box cells (the box cells at the same position in the reference coordinate system) are expressed as a variable Vi and a variable Di (i=1, 2, . . . , I). The sequencing of the box cells constituting the object map and the virtual space map is not particularly limited, but it is required that the ith box cells of the object map and the virtual space map are sequenced to form the box cells existing at the same position in the reference coordinate system.

When receiving the object map and the virtual space map, in a step S15, the collision detecting section 22 initializes the variable i indicative of the box cell to 1. Then, the operational flow advances to a step S16 in which the collision detecting section 22 makes a decision as to whether or not the box cell (the value set to corresponding to the box cell) Vi of the virtual space map is at 1. If the decision of the step S16 shows that the box cell Vi does not assume 1 (that is, assumes 0), that is, when the box cell Vi does not form a box cell in the interior of the virtual space, naturally the collision between the virtual space and the object does not occur and, therefore, the operational flow skips steps S17 and S18 to enter a step S19.

On the other hand, if the answer of the step S16 shows the box cell Vi=1, that is, when the box cell Vi is a box cell lying in the interior of the virtual space and there is a possibility that the virtual space and the object collide with each other, the operational flow proceeds to the step S17 so that the collision detecting section 22 decides whether or not the box cell (the value set to correspond to the box cell) Di of the object is at 1. If the decision of the step S17 indicates that the box cell Di does not assume 1 (namely, assumes 0), that is, when the box cell Di does not form a box cell in the interior of the object, naturally the virtual space and the object do not collide against each other, and the operational flow skips the step S18 and reaches the step S19.

Furthermore, if the decision of the step S17 indicates the box cell Di=1, that is, when the box cells Vi and Di are inside the virtual space and the object so that the collision therebetween occurs, the operational flow goes to the step S18, where the collision detecting section 22 outputs a collision detection signal to the processing determining section 7, then followed by the step S19.

The step S19 is for deciding whether or not the variable i is equal to the sum I of the box cells. If not equal thereto, the operational flow advances to a step S20 to increment the variable i by 1. Following this, the operational flow returns to the step S16 to conduct the same processing repeatedly.

On the other hand, if the answer of the step S19 indicates the variable i=I, that is, when the box cells constituting the virtual space map and the object map are all checked for the occurrence/no occurrence of the collision therebetween, the operational flow proceeds to a step S21 to decide whether or not to further continue the detection on the occurrence/no occurrence of the collision. If the answer of the step S21 indicates the continuation of the detection on the occurrence/ no occurrence of the collision, the operational flow returns to the step S13 to conduct the same processing after the next three-dimensional information (for example, three-dimensional information on the object obtained from a reference image and a detection image in the next frame) is supplied from the three-dimensional information creating section 4.

On the other hand, if the answer of the step S21 indicates no continuation of the detection on the occurrence/no occurrence of the collision, this processing comes to an end.

In this instance, it is also acceptable to set previously whether the detection on the occurrence/no occurrence of the collision is continued or not.

In addition, in the case of FIG. 9, although the collision judging section 5 makes out the object map and the virtual space map, it is also appropriate that the object map and the virtual space map are make out in the three-dimensional information creating section 4 and the virtual space setting section 6, respectively, and supplied-to the collision judging section 5.

Figure 11:
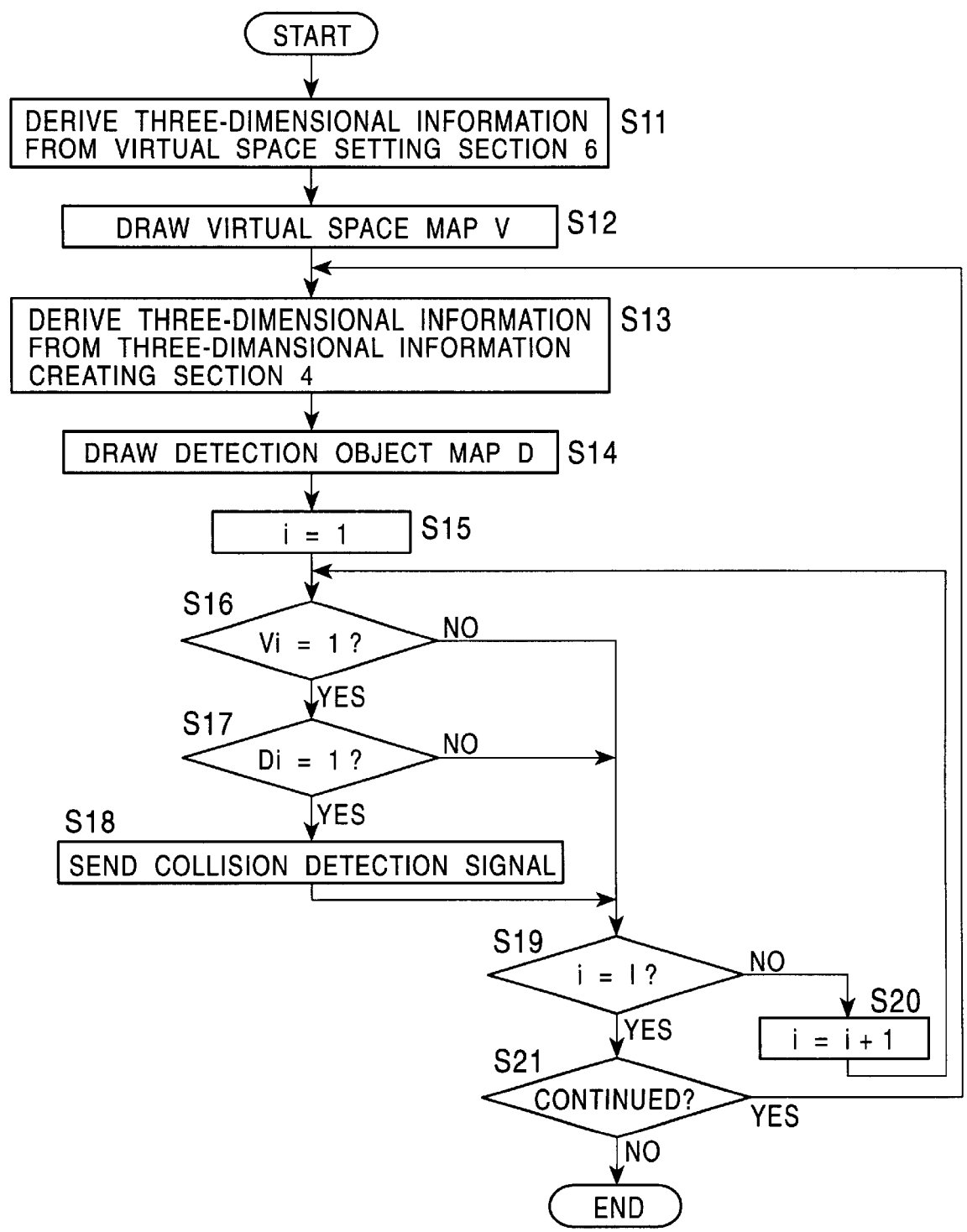
FIG. 11 is a flow chart available for explaining the processing in the collision judging section of FIG. 9.

Still additionally, in the case of FIG. 11, although the decision on the box cell Vi in the virtual space map is first made and, only when that box cell Vi constitutes the interior of the virtual space, then the decision on the box cell Di in the object map takes place, it is also possible that, contrary to this, the decision on the box cell Di in the object map is made first and only if that box cell Di organizes the interior of the object, then the decision on the box cell Vi in the virtual space map takes place.

Yet Additionally, in the case of FIG. 11, although, even after the detection of the collision between the object and the virtual space, the detection thereof continues, it is also appropriate that, when the collision is detected on one box cell, the detection of the collision is terminated at that time.

Moreover, in the description made with reference to FIG. 10, although one of the two values "1" and "0" representative of the interior and the exterior of the virtual space is set for the box cell Vi of the virtual space map, for example, it is also possible to set any one of three values or more to the box cell Vi of the virtual space map in accordance with the distance from the border of the virtual space. In this case, it is possible to recognize the degree of the intrusion of-the object into the virtual space.

Still moreover, in the above-described case, although the collision between the object and the virtual space is detected through the use of the object map and the virtual space map, it is also possible that, for example, the detection of the collision between the object and the virtual space is made by supposing an object and a virtual space, expressed in the form of a polygon, on a reference coordinate system so that a decision is made as to whether or not the polygon representing the object and the polygon representing the virtual space intersect. That is, the method of detecting the collision between the object and the virtual space is not limited to the above description.

By altering the processing to be conducted in the processing section 8, the spatial collision judging system (see FIG. 1), which detects the collision between a virtual space set virtually in a three-dimensional space and the actual object as described above, is applicable to various kinds of applications.

That is, for example, if the processing section 8 is constructed as a warning device, a recording unit or the like, the spatial collision judging system shown in FIG. 1 is applicable to a security system.

Figure 12A:
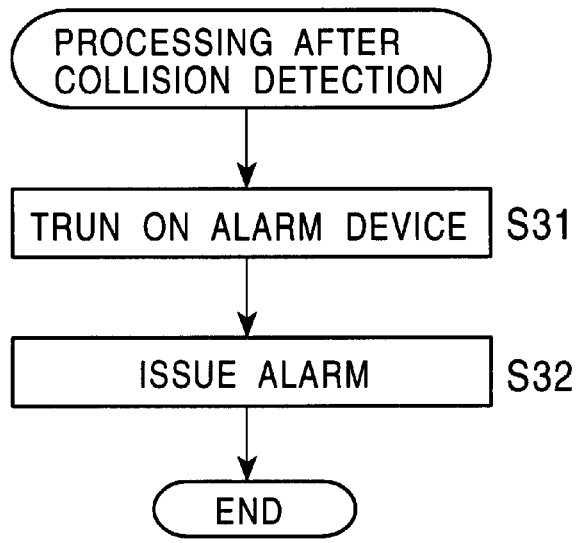
FIGS. 12A and 12B are flow charts available for explaining the processing in a processing determining section and a processing section shown in FIG. 1.
Figure 12B:
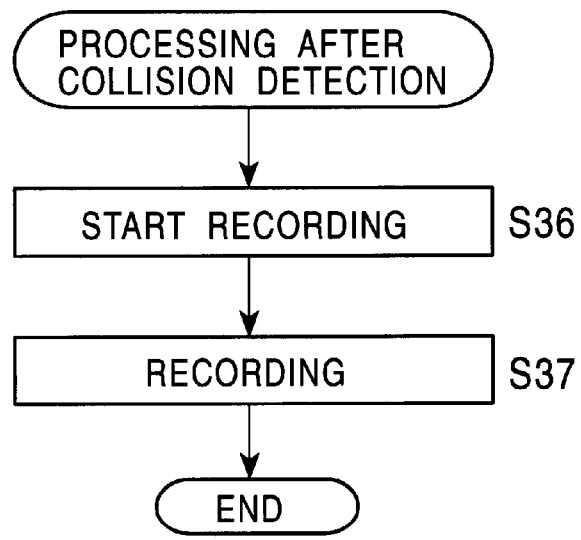

In the case in which an intrusion-prohibited space (no-entry zone) is set as a virtual space and a collision detection signal is outputted from the collision judging section 6, the processing determining section 7 and the processing section 8 can conduct, for example, the processing according to the flow charts shown in FIGS. 12A and 12B.

As the flow chart of FIG. 12A shows, in a step S31, the processing determining section 7 controls the processing section 8 turn on an warning device, and the operational flow goes to a step S32. In the step S32, the processing section 8 issues an alarm to inform that a doubtful person, a suspicious matter or the like intrudes into a virtual space forming a no-entry zone, and then terminates the processing. Alternatively, as the flow chart of FIG. 12B shows, in a step S36, the processing determining section 7 controls the processing section 8 to start the recording. In the following step S37, the processing section 8 record a doubtful person, a suspicious matter or the like who or which intrudes into a virtual space forming a no-entry zone, and then terminates the processing.

In addition, in response to the output of a collision detection signal from the collision judging section 5, the processing determining section 7 and the processing section 8 can also conduct the following processing.

Figure 13:
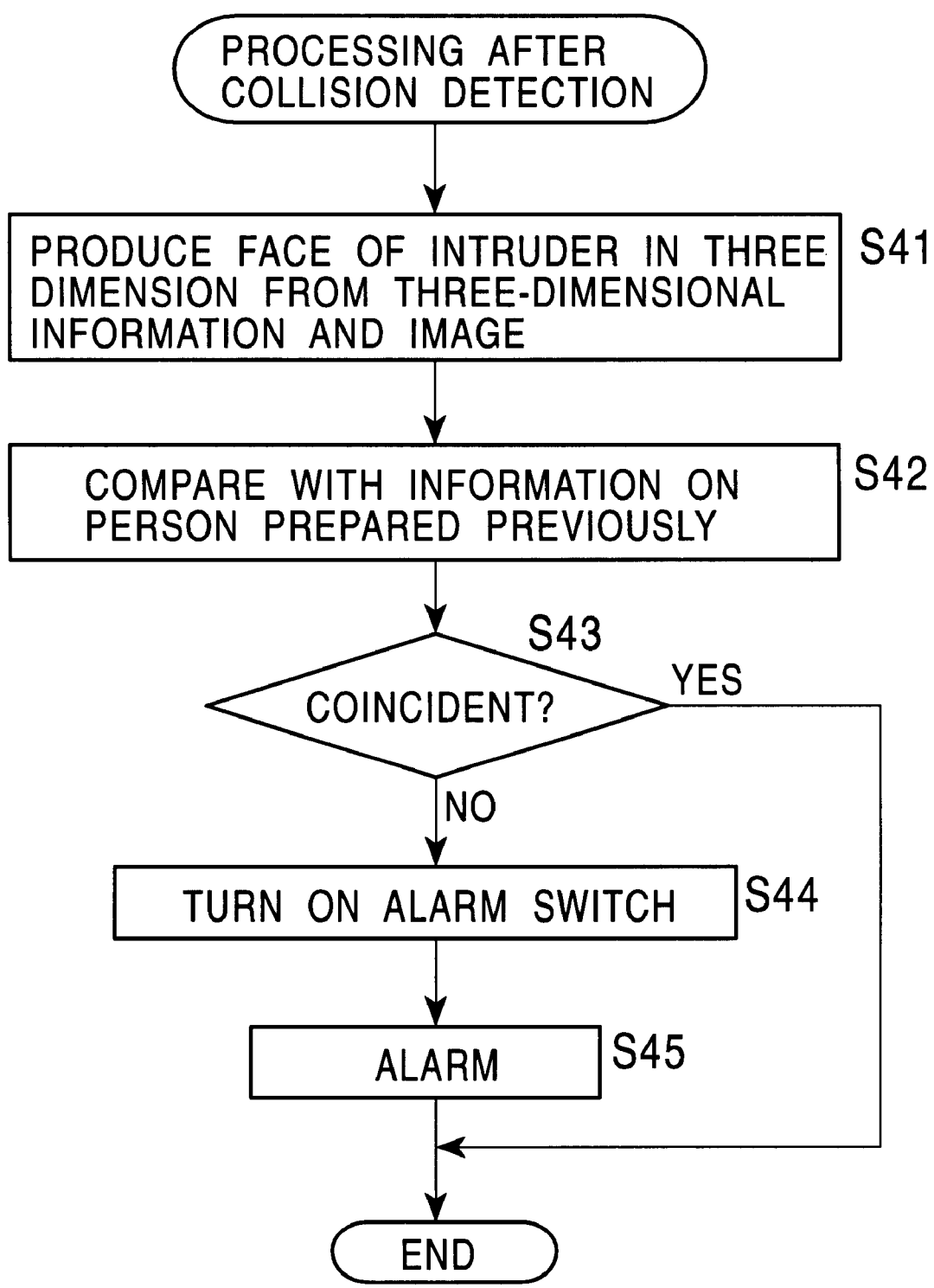
FIG. 13 is a flow chart available for explaining the processing determining section and the processing section shown in FIG. 1.

That is, as the flow chart of FIG. 13 shows, in a step S41, the processing determining section 7 first forms a three-dimensional image of an object colliding against a virtual space on the basis of three-dimensional information, the three-dimensional information creating section 4 creates, and images outputted from the camera sets $3_1$ to $3_N$, and the operational flow advances to a step S42. In the step S42, the processing determining section 7 reads out a stored three-dimensional image of a person from its own memory (not shown) to compare it with the three-dimensional image of the object colliding against the virtual space. That is, in the processing determining section 7, the memory built therein retains the three-dimensional images of one or more people in advance, and in the step S42, these three-dimensional images are compared with the three-dimensional image of the object colliding against the virtual space.

Furthermore, the operational flow goes to a step S43 in which the processing determining section 7 decides whether or not the feature of three-dimensional image of the object colliding against the virtual space coincides with the feature of any one of the three-dimensional images of people stored in advance. If coinciding with each other, the operational flow skips steps S44 and S45 to terminal this processing. That is, in this case, the processing determining section 7 terminates the processing without particularly controlling the processing section 8.

On the other hand, if the answer of the step S43 indicates that the feature of three-dimensional image of the object colliding against the virtual space does not coincide with the feature of any one of the three-dimensional images of people stored in advance, the operational flow goes successively to the steps S44 and S45 to conduct the processing similar to that in the steps S31 and S32 in FIG. 12A, then the processing comes to an end. That is, in this case, the processing determining section 7 controls the processing section 8 to turn on an warning device, while the processing section 8 issues an alarm according to that control.

In the case of FIG. 12A, since the warning device is activated even if any object enters the virtual space, when a guard who keeps watch on an no-entry zone comes in the virtual space, for example, for security, the warning device operates naturally to issue an alarm. However, it is not desirable that the warning device is activated in such a case. For this reason, for example, a three-dimensional image of the guard is stored in a memory incorporated into the processing determining section 7 and the processing determining section 7 and the processing section 8 are designed to conduct the processing according to the flow chart of FIG. 13, which prevents the alarm from issuing in the case in which the guard comes in the no-entry zone (virtual space).

In addition, for example, if a specific mark is attached onto a uniform of the guard and the corresponding mark is also stored in the built-in memory of the processing determining section 7 to make a decision on the coincidence/no coincidence between the marks, then it is also possible to prevent the alarm from issuing when the guard enters the no-entry zone. Still additionally, if the guard carries a transmitter made to output a predetermined radio wave and the processing determining section 7 detects whether or not the object entering the no-entry zone generates that radio wave, then the prevention of the issue of the alarm is also possible in the case in which the guard enters the no-entry zone.

Moreover, when a collision detection signal is outputted from the collision judging section 5, the processing determining section and the processing section 8 can additionally conduct the following processing to make out a stereoscopic picture of an object intruding into a virtual space.

Figure 14:
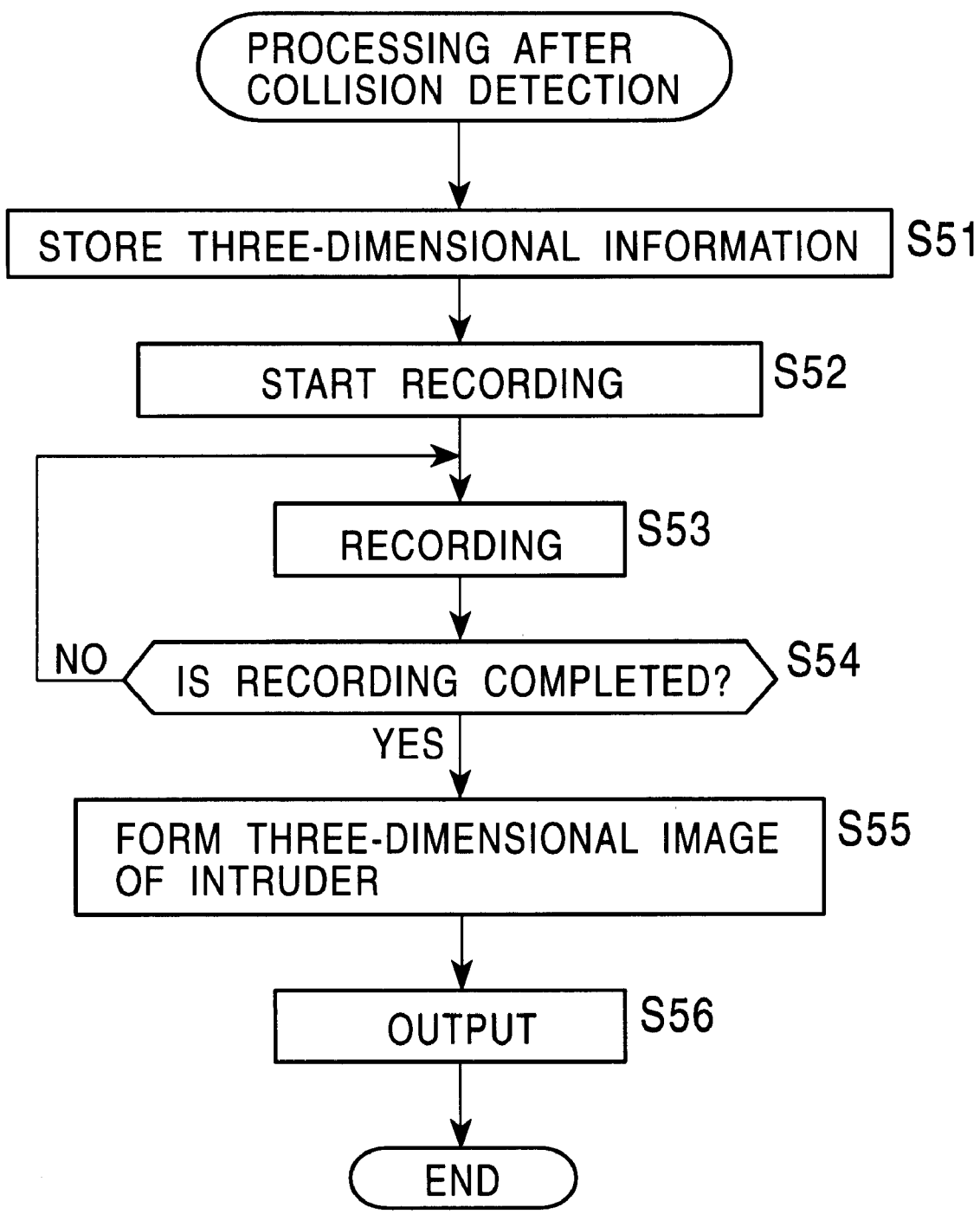
FIG. 14 is a flow chart available for explaining the processing determining section and the processing section shown in FIG. 1.

That is, as the flow chart of FIG. 14 shows, in a step S51, the processing determining section 7 first retains the three-dimensional information the three-dimensional information creating section 4 creates, and then the operational flow goes to a step S52 to control the processing section 8 to start the recording. in the step S53, the processing section 8 records the object invading into the virtual space under the control by the processing determining section 7.

Furthermore, the operational flow advances to a step S54 in which the processing determining section 7 decides whether or not to terminate the recording. The answer of the step S54 indicates no termination of the recording, the operational flow returns to the step S53 to repeat the same processing. That is, in this case, the processing section 8 continues the recording. The decision on the continuation of the recording in the step S54 can depend upon, for example, whether or not a predetermined time is elapsed from the start of the recording, or whether or not the object exists continuously in the virtual space.

On the other hand, if the answer of the step S54 indicates the termination of the recording, then the processing determining section 7 controls the processing section 8 to terminate the recording, so that the recording by the processing section 8 comes to an end. Additionally, the operational flow proceeds to a step S55 where the processing determining section 7 produces a three-dimensional image (three-dimensional montage picture) on an object on the basis of the three-dimensional information on the object stored in the step S51 and an image (two-dimensional image) of the object recorded by the processing section 8. In a step S56, this three-dimensional image is displayed on a non-shown monitor, or is printed by a non-shown printer, before the processing comes to an end.

In addition to the above-described security systems, the spatial collision judging system shown in FIG. 1 is also applicable to, for example, a system in which a virtual space is set in a sidewalk or a driveway to count people or cars passing through the virtual space, or to a system which photographs or recognizes people or cars passing through a virtual space in response to the passage through the virtual space. Still additionally, if a virtual space coinciding with a strike zone is set on a home base for baseball games to detect whether or not the ball passes through the virtual space, for example, it is possible to make a decision on strike/ball automatically or offer auxiliary information for the decision on strike/ball to an umpire.

In addition to the setting of a virtual space by the above-described operation of the virtual space setting section 6, it is also possible to set a virtual space on the basis of the three-dimensional information created in the three-dimensional information creating section 4. That is, the virtual space can be set automatically without being set manually.

Figure 15:
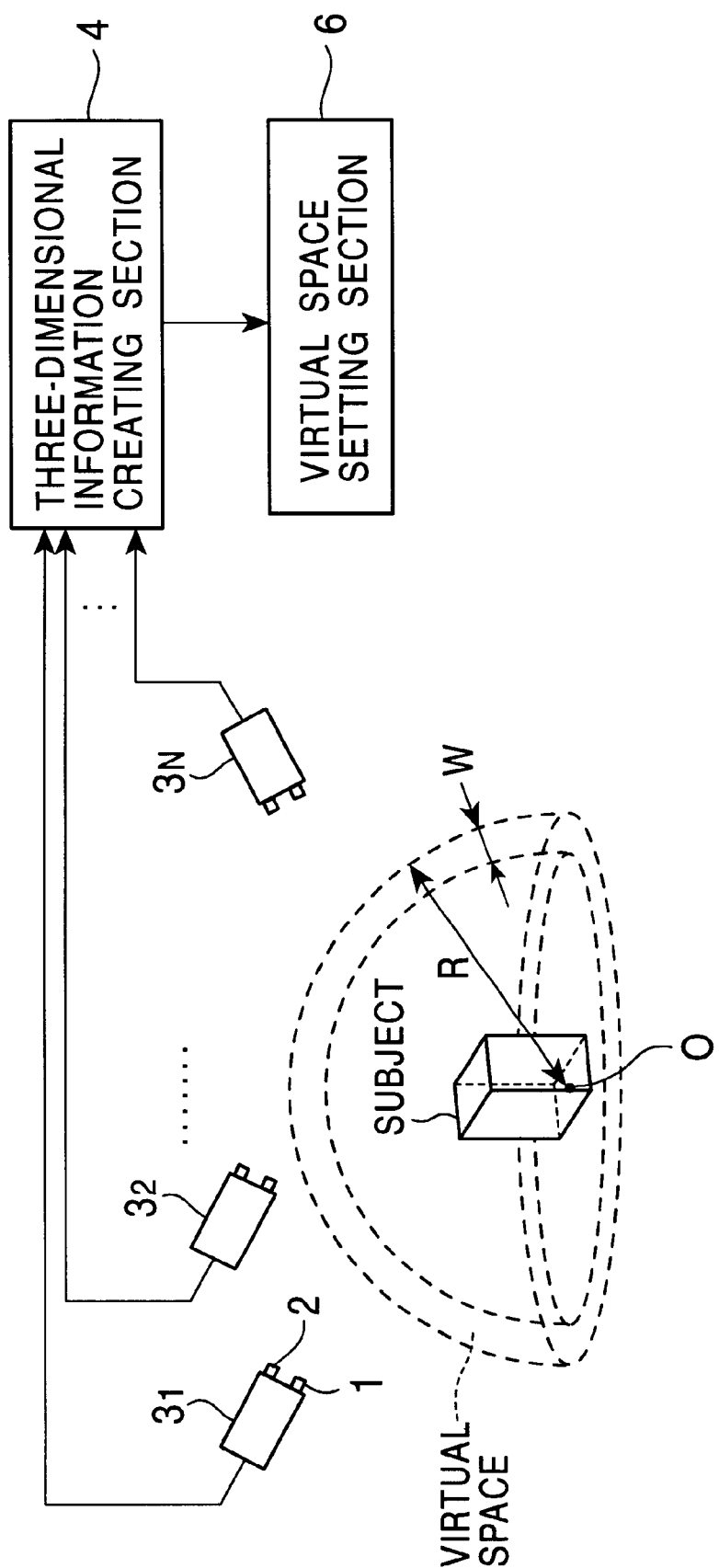
FIG. 15 is an illustration available for explaining a method of setting a virtual space.

Concretely, for example, as FIG. 15 shows, when a subject to be protected (monitored) is put on a floor, a hollow semi-spherical virtual space surrounding the subject is set on the basis of the three-dimensional information on the subject. Incidentally, in FIG. 15 (as well as FIGS. 17 and 20 which will be mentioned later), the collision judging section 5, the processing determining section 7 and the processing section 8 are omitted from the illustration.

Figure 16:
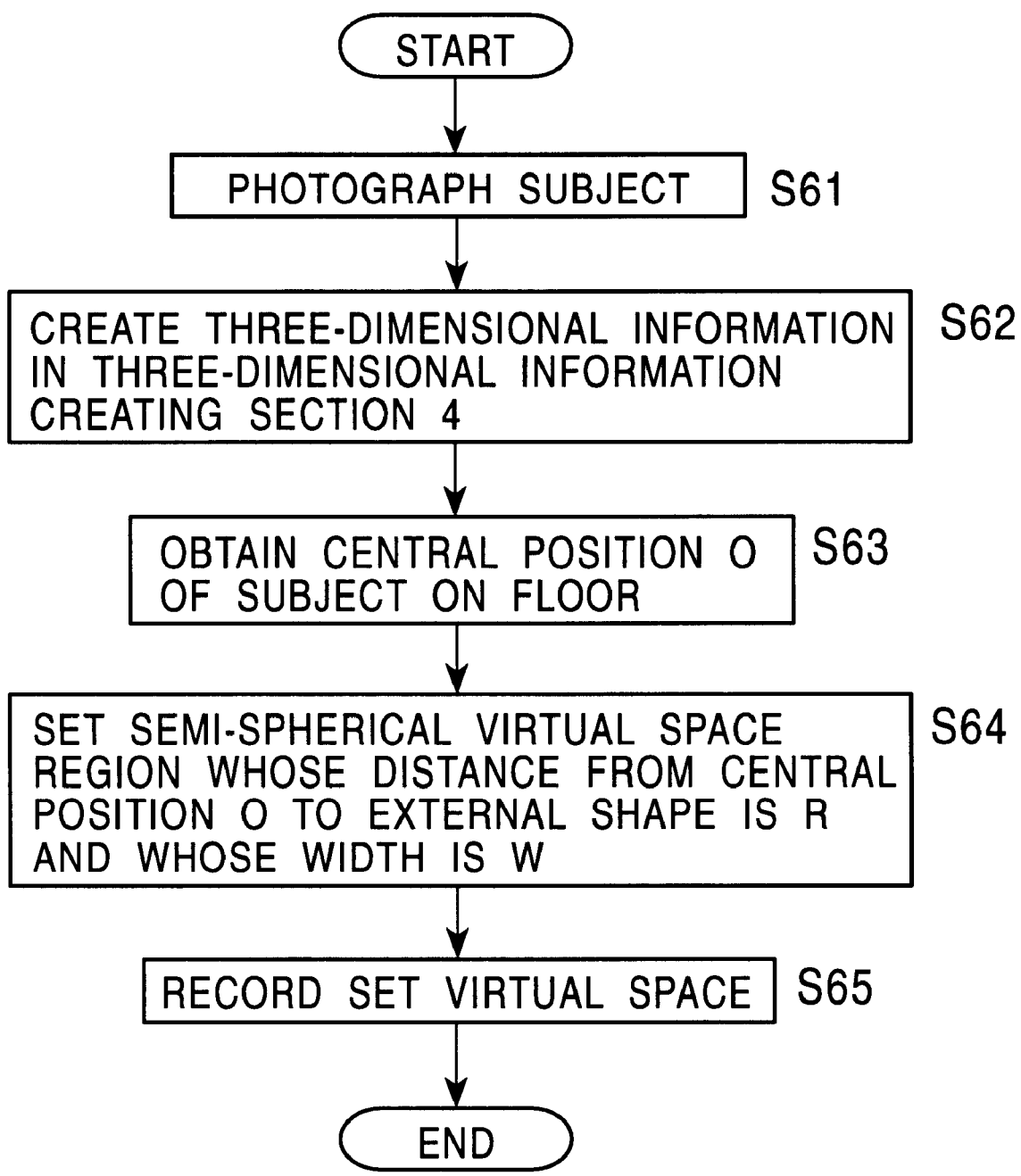
FIG. 16 is a flow chart available for explaining the virtual space setting method.

In this case, as the flow chart of FIG. 16 shows, first, in a step S61, an subject is photographed through the camera sets $3_1$ to $3_N$ and the resultant images (reference camera images and detection camera images) are supplied to the three-dimensional information creating section 4. In a step S62, the three-dimensional information creating section 4 creates a distance image as the three-dimensional information on the subject on the basis of the images from the camera sets $3_1$ to $3_N$, and supplies them to the virtual space setting section 6.

In a step S63, the virtual space setting section 6 obtains the central point (for example, the center of gravity of the configuration of the floor portion with which the subject comes into contact) O of the subject on the floor surface on the basis of the three-dimensional information on the subject from the three-dimensional information creating section 4. Furthermore, in a step S64, the virtual space setting section 6 supposes a semi-sphere with a radius of R and a semi-sphere with a radius of R-W in a state where the point O is taken as their centers, and sets, as a virtual space, a space (space with a width of W) surrounded by the two semi-spheres. Additionally, in a step S65, the virtual space setting section 6 stores three-dimensional information on that virtual space, and then this processing comes to an end.

Incidentally, the radius R-W is required to be longer than the distance from the point O to the furthest point of the subject (otherwise, the subject and the virtual space collide against each other so that the collision judging section 6 outputs the collision detection signal at all times.)

In addition, the virtual space setting processing described with reference to FIG. 16 can be made once before the spatial collision judging system starts the detection of the collision with the virtual space, and it can also be made successively even after the start of the detection of the collision with the virtual space to update the virtual space. If the virtual space is thus updated, for example, it is possible to cope with the case that a subject moves on a floor.

Still additionally, in the case in which a hollow virtual space is set as shown in FIG. 15, it is possible to detect the intrusion from the external of the virtual space into the hollow portion of the virtual space, and to detect the intrusion in the opposite direction, that is the invasion from the hollow portion of the virtual space toward the exterior of the virtual space. Accordingly, for example, the movement of a subject from the hollow portion enclosed with the virtual space is detectable. Yet additionally, if a value corresponding to the distance from the border of the virtual space is set in a box cell of the virtual space map, in addition to the intrusion into the virtual space, it becomes possible to detect which direction the intrusion occurs from.

In the case of FIGS. 15 and 16, although a hollow semi-spherical virtual space is set to enclose a subject, in this case, even if the subject moves in the range of the hollow portion enclosed with the virtual space, the subject does not collide with the virtual space; therefore, the detection of the movement of the subject within such a range is impossible. However, there is a case that it is desirable to detect even a slight movement of the subject.

Figure 17:
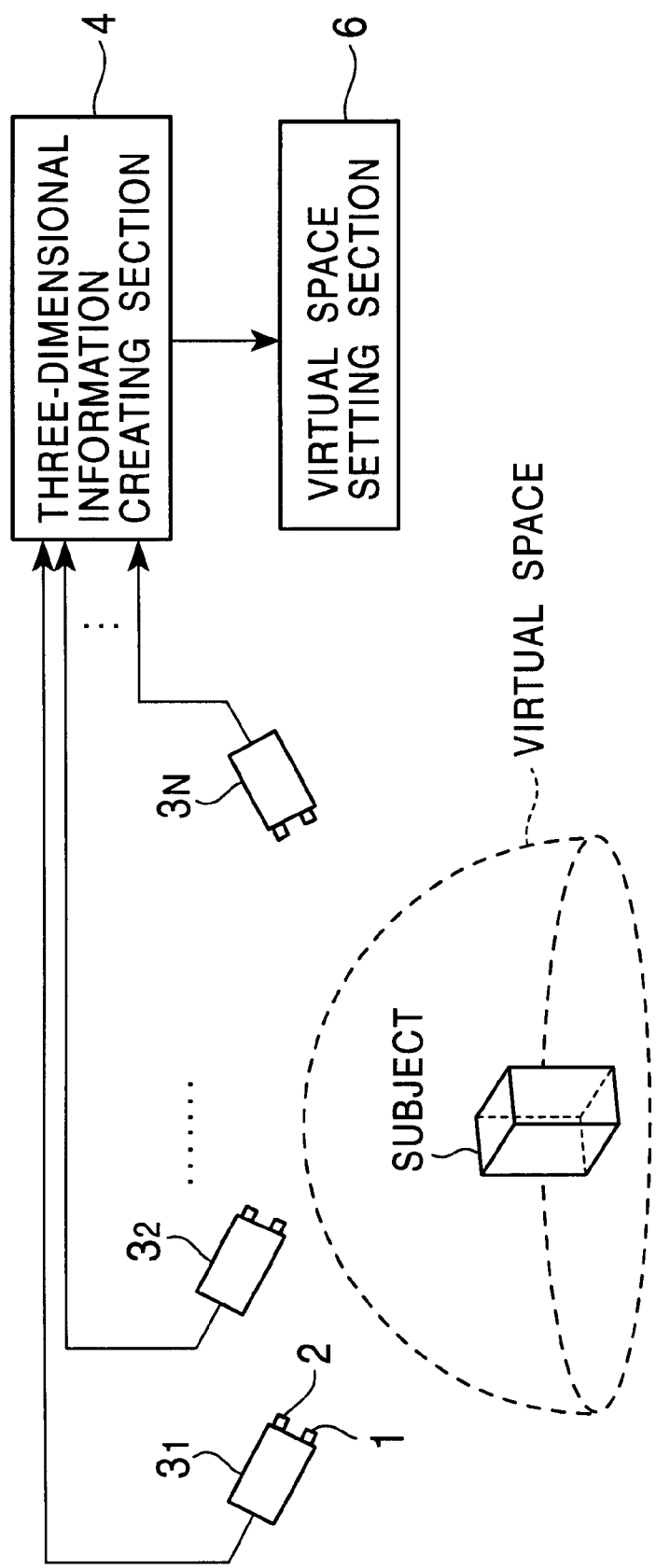
FIG. 17 is an illustration available for explaining the virtual space setting method.

This is feasible, for example, in a manner that, as shown in FIG. 17, a virtual space (in the case of FIG. 17, its external shape is a semi-spherical configuration) is set to surround the subject lying on a floor without defining a gap therebetween.

Figure 18A:
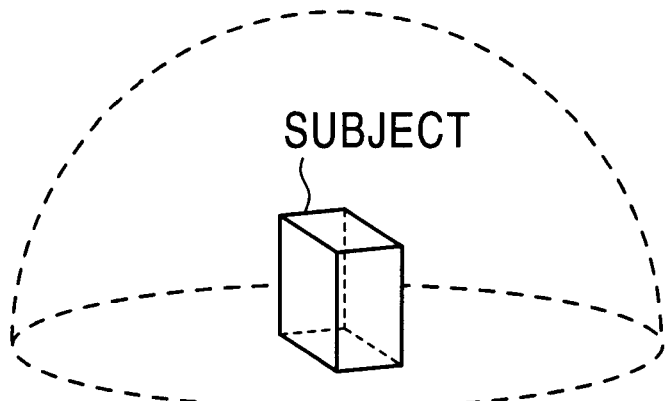
FIGS. 18A and 18B are illustrations available for explaining the virtual space setting method.
Figure 18B:
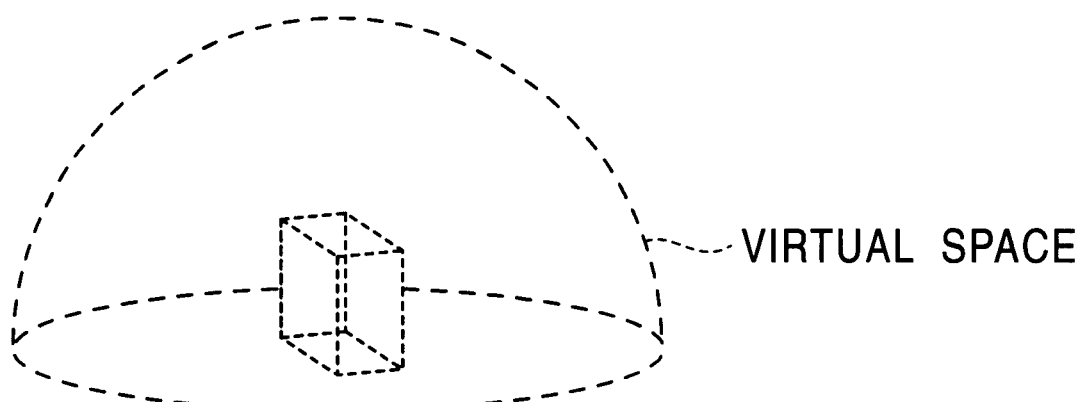

Such a virtual space can be set, for example, in a manner that a semi-spherical space accommodating a subject is supposed as shown in FIG. 18A and a space the subject occupies is subsequently removed from that semi-spherical space as shown in FIG. 18B.

Figure 19:
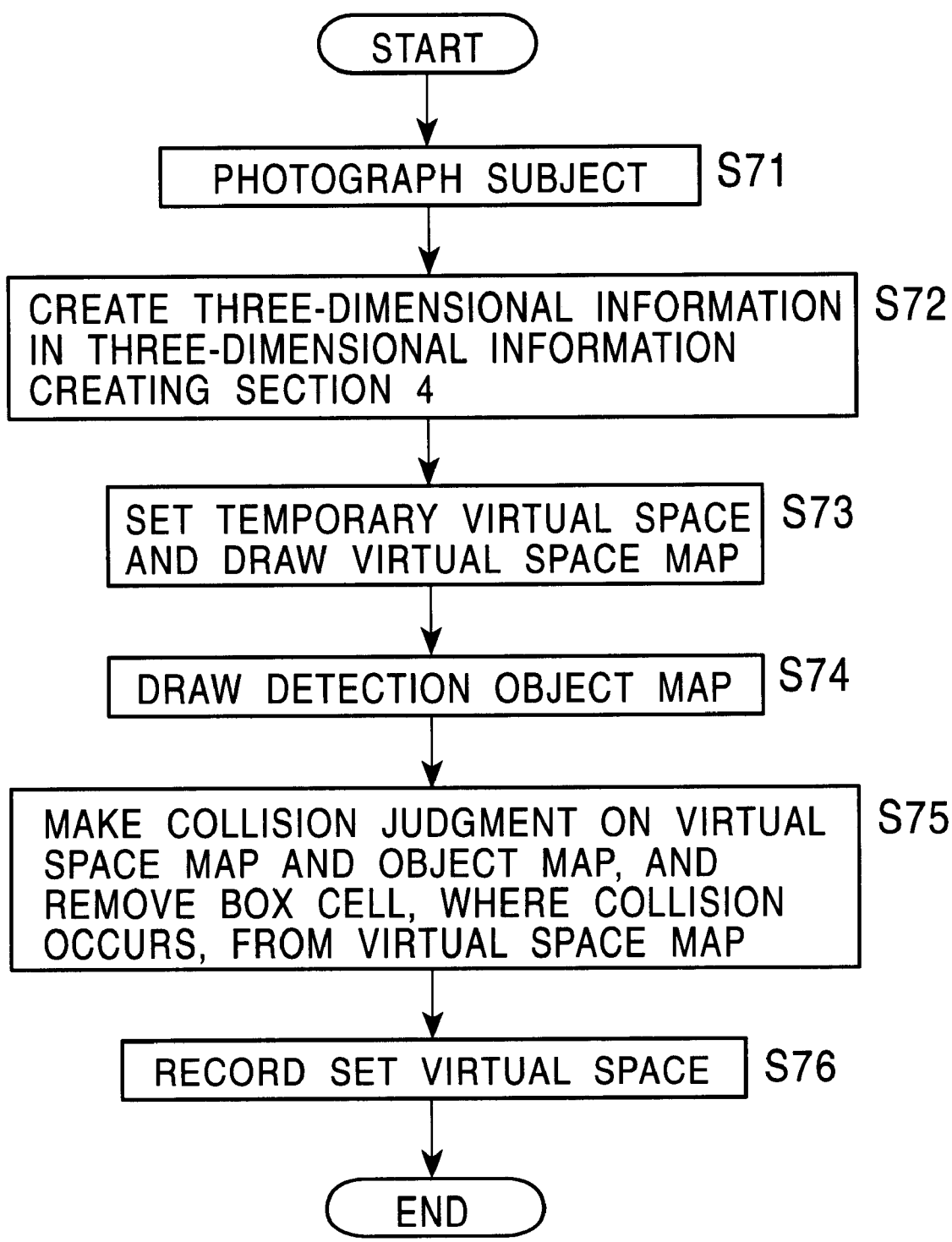
FIG. 19 is a flow chart available for explaining the virtual space setting method.

That is, as the flow chart of FIG. 19 shows, first of all, in a step S71, the subject is taken through the camera sets $3_1$ to $3_N$ and the resultant images (reference camera images and detection camera images) are fed to the three-dimensional information creating section 4. In a step S72, the three-dimensional information creating section 4 produces a distance image as three-dimensional information on the subject on the basis of the images from the camera sets $3_2$ to $3_N$ and supplies it to the virtual space setting section 6.

In a step S73, as well as the description made with reference to FIGS. 15 and 16, the virtual space setting section 6 obtains a semi-sphere with a radius of R in which the central point O on the subject on the floor is taken as its center on the basis of the three-dimensional information on the subject from the three-dimensional information creating section 4, and sets it as a provisional virtual space. Additionally, in the step S73, a virtual space map mentioned above is made out on that provisional virtual space, and the operational flow proceeds to a step S74.

In the step S74, the virtual space setting section 6 makes out an object map on an object, as described above, on the basis of the three-dimensional information on that object from the three-dimensional information creating section 4. Then, the operational flow goes to a step S75, where the virtual space setting section 6 detects the box cells corresponding to the provisional virtual space colliding against the object on the basis of the virtual map and the object map, and the virtual space map is altered so that the detected box cells turn from the box cells constituting the interior of the virtual space to the box cells organizing the exterior of the virtual space. Additionally, in the step S75, the final virtual space is set according to the altered virtual map. Then, the operational flow goes to a step S76 where the virtual space setting section 6 stores the three-dimensional information on the final virtual space, and this processing comes to an end.

According to the virtual space setting method described with reference to FIGS. 17 to 19, it is possible to set a virtual space enclosing an subject without making a gap therebetween, and further to set a virtual space surrounding the subject to leave a margin in some degree. In the case in which such a virtual space is set, the spatial collision judging system shown in FIG. 1 can be used, for example, as a form correcting system for golf swing or the like.

Figure 20:
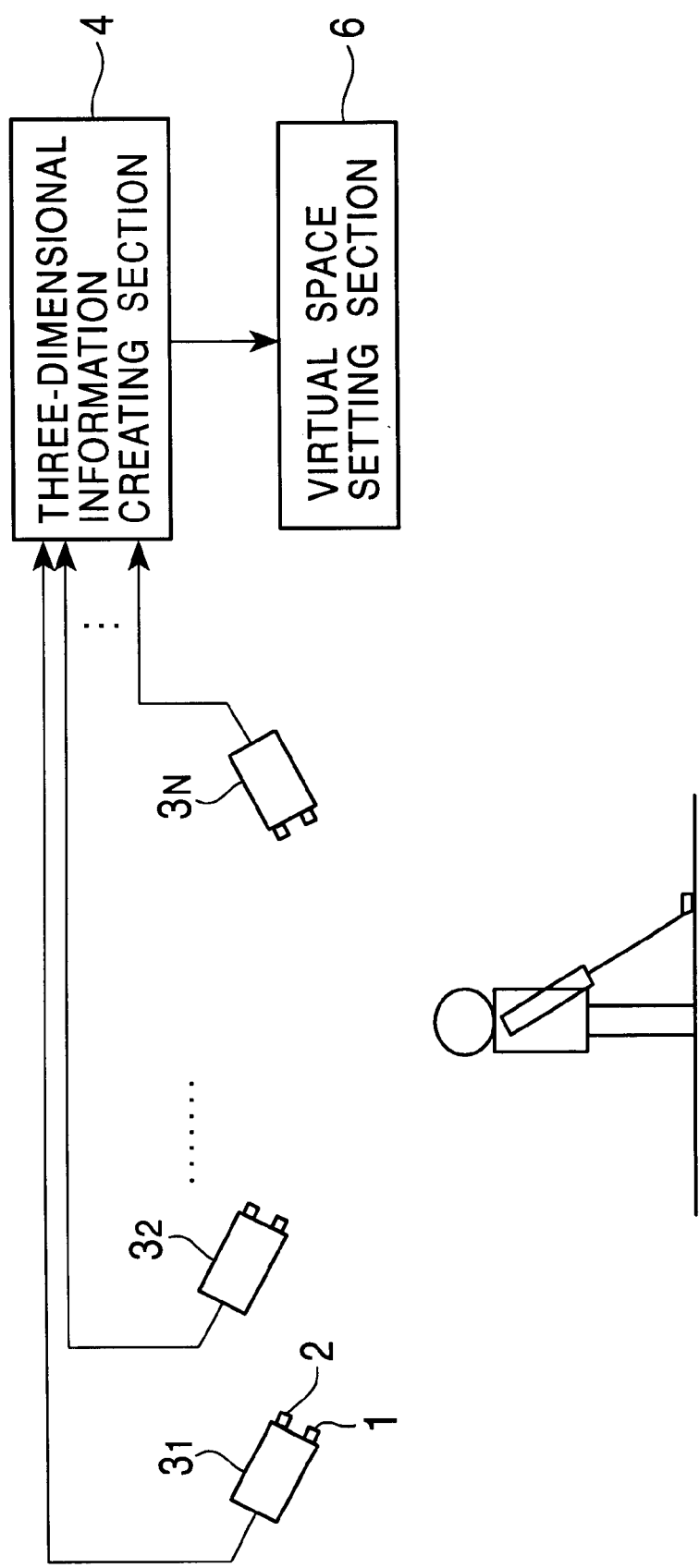
FIG. 20 is an illustration available for explaining the virtual space setting method.
Figure 21A:
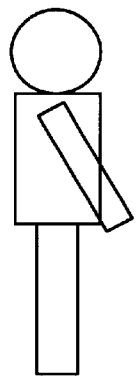
FIGS. 21A, 21B and 21C are illustrations available for explaining the virtual space setting method.
Figure 21B:
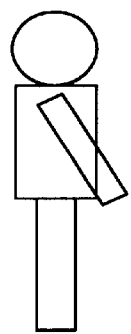
Figure 21C:
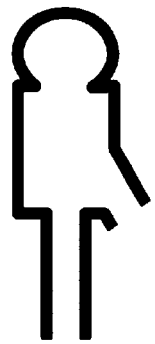

That is, for example, as FIG. 20 shows, a person (for example, a professional golfer or the like) acting as a model shows a swing, and the camera sets $3_1$ to $3_N$ photographs the series of movements of the swing and the three-dimensional information creating section 4 produces three-dimensional information about the series of movements on the basis of the resultant images. Now, assuming that, for example, the three-dimensional information creating section 4 obtains the three-dimensional information indicative of a form shown in (A) of FIG. 21, because this condition does not match commonly with the height, lengths of hands and legs, a physical build such as a flesh and clothes of the user who wants the correction of the form of the swing, the three-dimensional information obtained from the three-dimensional information creating section 4 is normalized as shown in (B) of FIG. 21 to meet the physical build of the user and others. Additionally, as shown in a state painted black in (C) of FIG. 21, a space which has a thickness (for example, 5 cm) and which surrounds the configuration defined by the normalized three-dimensional information to leave a margin in some degree is supposed and is set as a virtual space. In this case, the virtual space is produced at every frames (for example, every 30 frames/sec) of the image obtained by photographing the series of movements of the swing. Therefore, a virtual space changing in time series is attainable to a series of movements of the swing of a person acting as a model.

Figure 22:
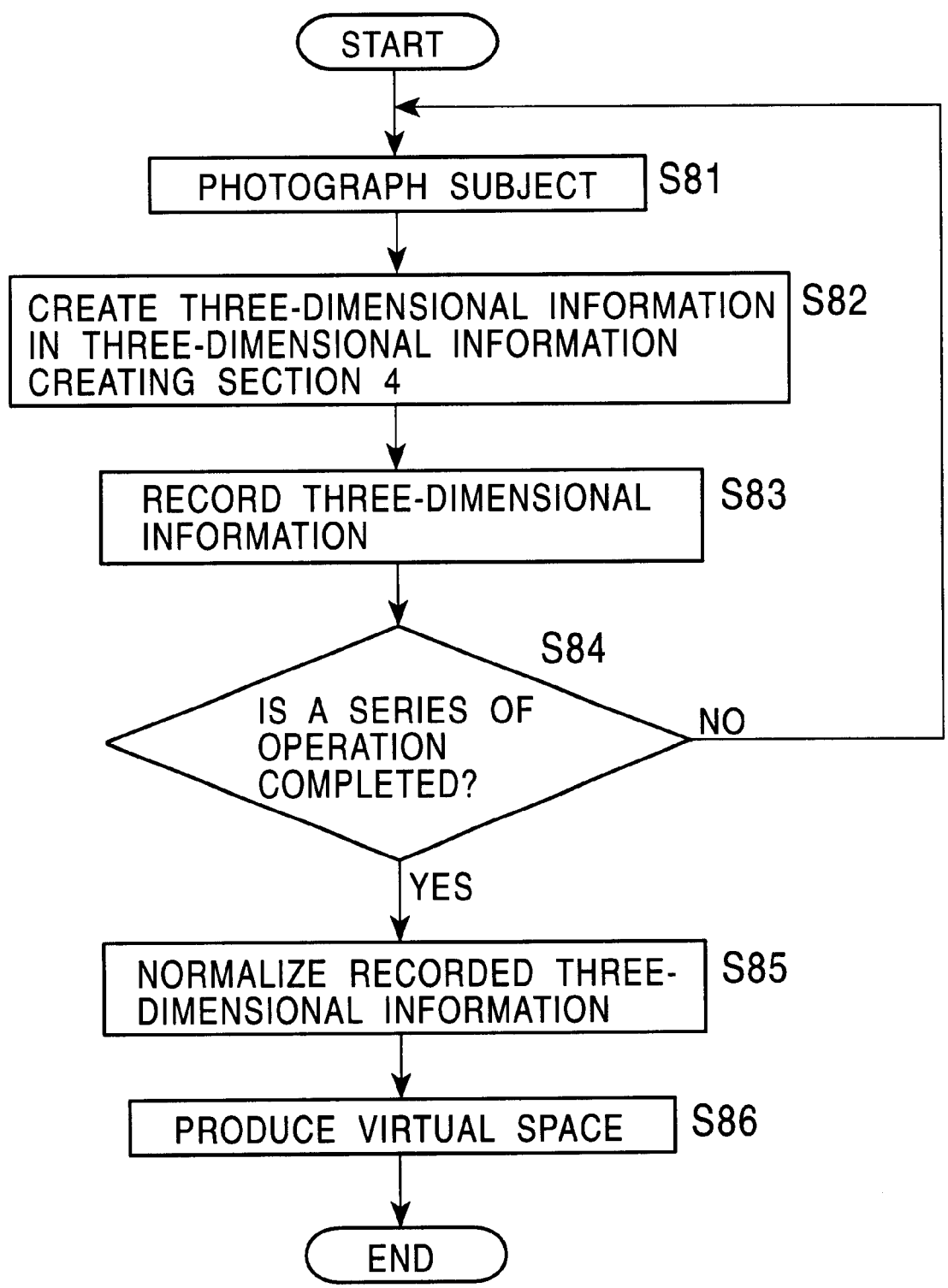
FIG. 22 is a flow chart available for explaining the virtual space setting method.

Moreover, referring to the flow chart of FIG. 22, a further description will be given hereinbelow of the virtual space setting method described with reference to FIGS. 20 and FIGS. 21A, 21B, and 21C.

A person acting as a model shows a swing, and in a step S81, the person (subject) acting as a model is photographed by the camera sets $3_1$ to $3_N$. The images obtained by the photographing are supplied to the three-dimensional information creating section 4. In a step S82, the three-dimensional information creating section 4 produces a distance image as the three-dimensional information on the person acting as a model on the basis of the images from the camera sets $3_1$, to $3_N$, and supplies it to the virtual space setting section 6. In a step S83, the virtual space setting section 6 stores the three-dimensional information on the person acting as a model from the three-dimensional information creating section 4, and, in the next a step S84, it makes a decision as to whether the series of movements of the person acting as a model are completed or not, that is, whether the swing comes to an end. If the decision of the step S84 indicates no completion of the swing, the operational flow returns to the step S81 to handle the next frame.

On the other hand, if the decision of the step S84 indicates the completion of the swing, the operational flow advances to a step S85, where the virtual space setting section 6 normalizes the three-dimensional information, obtained from the image of each frame, to the physical build of the user and others, then followed by a step S86 where the virtual space setting section 6 supposes a space with a predetermined thickness surrounding the configuration defined by the normalized three-dimensional information to leave a margin in some degree, with this space being set and recorded as a virtual space. The virtual space setting section 6 sets such a virtual space on the three-dimensional information of each frame of the image obtained by photographing the series of movements of the swing, and stores the virtual spaces. Subsequently, this processing comes to an end.

Figure 23:
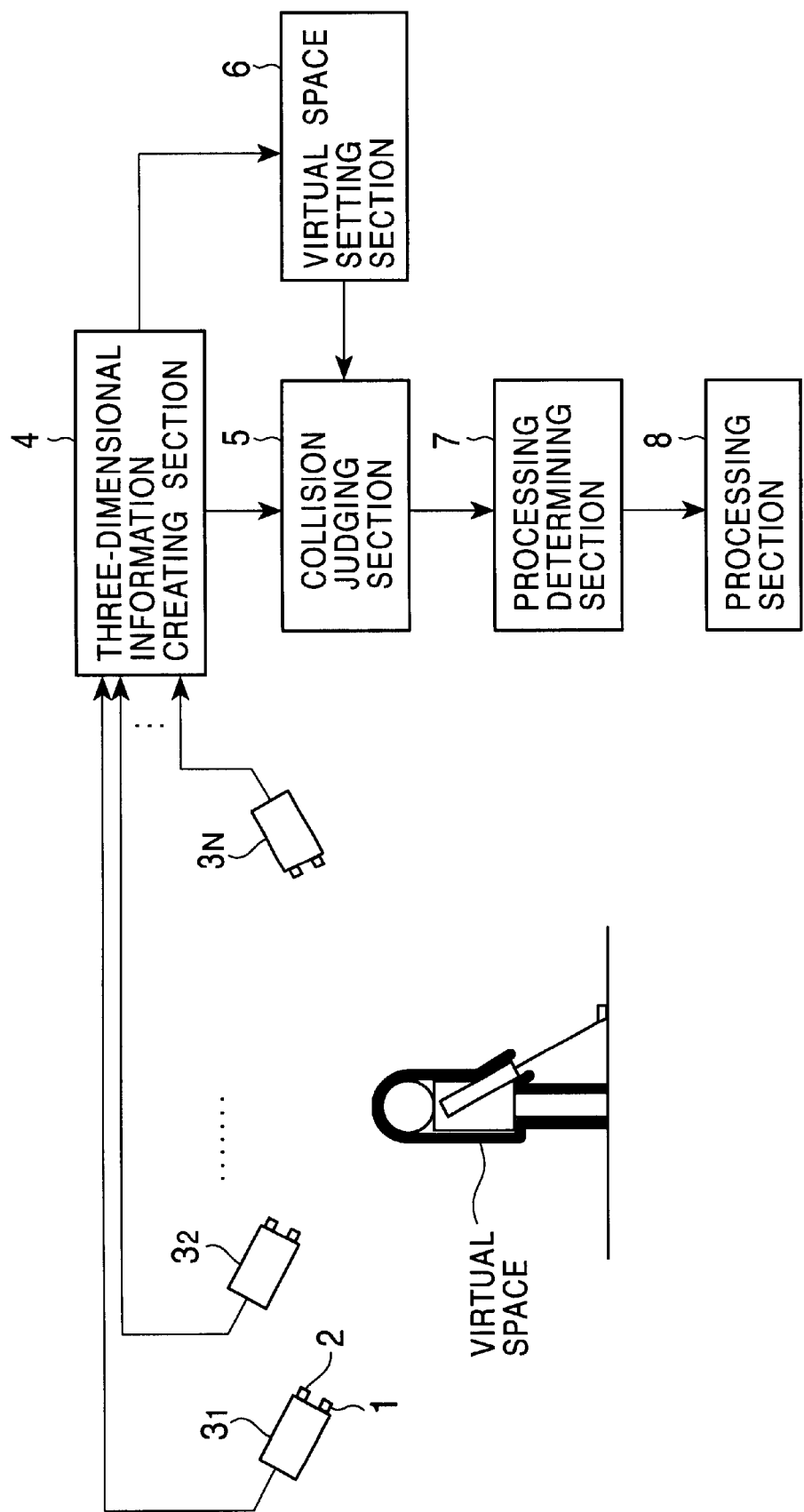
FIG. 23 is an illustration for describing a case in which this invention is employed for a form correcting system.

After the virtual spaces are set in this way, as shown in FIG. 23, the user enters the region enclosed by the virtual space and practices the swing. In this case, if the swinging operation of the user substantially coincides with the swinging operation of the person acting as a model, the collision between the virtual space and the user does not occur. Otherwise, the collision occurs, and the collision judging section 5 detects this collision. Accordingly, the processing section 8 displays the occurrence or no occurrence thereof to inform the user of the coincidence or no coincidence with the swing of the person acting as a model. Additionally, by presenting the position of the collision in the virtual space or the process of the swing in which the user collides against the virtual space, it is possible to teach the use the position or the timing to be corrected.

In FIGS. 20 to 23, although the correction of the golf swing takes place, for example, if a virtual space is set according to the face of a golf club to detect the collision against a golf ball, or, on the contrary, if a virtual space is set according to the gold ball to detect the collision against the face of the golf club, for example, it is possible to check the direction of the face at the impact, or to check the position of the face against which the gold ball strikes.

In addition, the aforesaid form correcting system is also applicable to sports other than the gold, dance and others.

Figure 24:
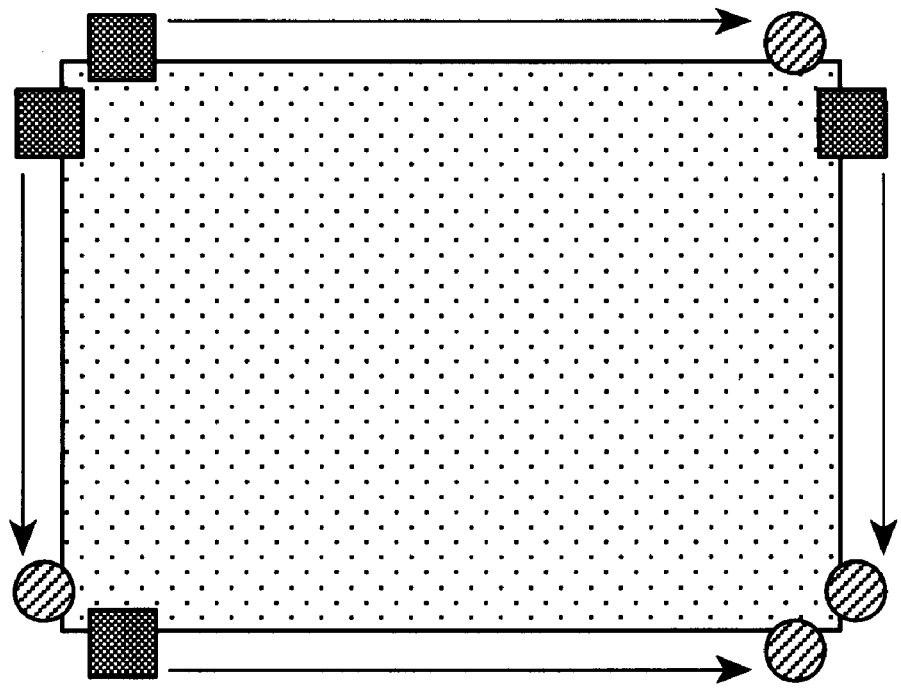
FIG. 24 is a constructional example of an infrared detection system.

As described above, a predetermined virtual space is set in a three-dimensional space while three-dimensional information on the actual object is created so that a decision as to whether or not the collision between the object and the virtual space occurs is made on the basis of the three-dimensional information on the object. Accordingly, it becomes possible to set a virtual space optionally for detecting the collision between the virtual space and the actual object. That is, for example, in an infrared detection system, as described above with reference to FIG. 24, there is a need to install infrared emitting sections and infrared receiving sections to the configuration and size of a no-entry zone, and for example, in the places such as an event site and a public space to which many people have access, difficulty can be experienced in installing the system. On the other hand, in the case of the spatial collision judging system shown in FIG. 1, if the camera sets 3n is placed so that a virtual space is included in the field of view, this system will do, that is, the freedom of the installation becomes high. The camera sets $3_n$ can be located without being substantially restricted by the configuration and size of the virtual space. Additionally, since the virtual space is a space supposed virtually, unlike the region defined by the locations of the infrared emitting sections and the infrared receiving sections or the emitting and receiving directions of the infrared rays, the virtual space can be formed into an arbitrary configuration. Still additionally, the alteration of the virtual space is easily achievable only by changing the three-dimensional information (parameter) defining the virtual space.

Incidentally, in this embodiment, the three-dimensional information on the actual object is created through the stereo processing, the method of obtaining the three-dimensional information on the object is not limited to this. For example, it is also possible to employ a method of measuring a distance to the object by emitting a laser beam from a range finder according to the principle of the tigonometrical survey.

Since this invention is for detecting the collision between a virtual space, which can be set into an arbitrary configuration and size, and an actual object, in addition to the aforesaid applications, this invention is also applicable to various types of applications.

For example, a combination of the spatial collision judging system of FIG. 1 and an HMD (Head Mount Display) forming a virtual image viewing display for presenting a virtual image can provide various types of user interfaces. Concretely, if an virtual image including a screen and a keyboard is displayed on the HMD and a virtual space is set at the position of each of virtual images of keys constituting the keyboard, in a manner that the collision between the virtual space set at the position of the virtual image of each of the keys and a finger of the user is detected and a display according to the key corresponding to the position at which the collision therebetween is detected is made on the virtual image screen, the typing becomes possible without using a keyboard actually. Additionally, for example, it is also possible to realize a remote commander for a television image receiving unit, a VTR and other AV (Audio/Visual) devices according to a similar way.

Furthermore, the spatial collision judging system of FIG. 1 is also realizable in a manner that a computer implements a computer program (control information) to conduct the above-described processing, or by a dedicated hardware. Incidentally, in the case of the use of the computer program, it is possible to present or supply the computer program in a state recorded in a record medium such as an optical disk, a magneto optical disk, a magnetic disk, a magnetic tape, a phase-changing disk or the like, and further it is also possible to prevent it through a transmission medium, such as the Internet, a CATV (Cable Television) network, a satellite circuit, a ground wave or the like.

As described above, according to this embodiment, a given virtual space is set in a three-dimensional space and the three-dimensional information on an object is produced. In addition, a decision is made, on the basis of the three-dimensional information on the object, as to whether or not the collision between the object and the virtual space occurs. Accordingly, it is possible to detect the collision between an optional space in a three-dimensional space and an object.

It should be understood that the foregoing relates to only a preferred embodiment of the present invention, and that it is intended to cover all changes and modifications of the embodiment of the invention herein used for the purpose of the disclosure, which do not constitute departures from the spirit and scope of the invention.

What is claimed is:

1. An information processing system for processing three-dimensional information on an object existing in a three-dimensional space, comprising:

setting means for setting a predetermined virtual space in said three-dimensional space;

creating means for creating said three-dimensional information on said object; and judging means for making a decision, on the basis of said three-dimensional information on said ;object, on whether or not a collision between said object and said virtual space occurs, wherein said setting means sets, as said virtual space, a space having a predetermined configuration formed to enclose a predetermined space in said three-dimensional space and a predetermined width.

2. An information processing system according to claim 1, further comprising operating means for inputting information needed for setting said virtual space, with said setting means setting said virtual space on the basis of the input by said operating means.

3. An information processing system according to claim 1, wherein said setting means sets, as said virtual space, a space enclosing a predetermined subject in said three-dimensional space but not including said subject.

4. An information processing system according to claim 1, wherein said setting means sets, as said virtual space, a space varying in time series.

5. An information processing system according to claim 1, wherein said setting means sets said virtual space on the basis of a plurality of images obtained by photographing said three-dimensional space.

6. An information processing system according to claim 1, wherein said creating means creates said three-dimensional information on the basis of a plurality of images obtained by photographing said object.

7. An information processing system according to claim 6, further comprising image pickup means for photographing said object.

8. An information processing system according to claim 1, further comprising:
   object map drawing means for making out, on the basis of said three-dimensional information on said object, an object map indicating a position, at which said object exists in said three-dimensional space, by a predetermined coordinate system; and
   virtual space map drawing means for making out a virtual space map indicating a position, at which said virtual space exists, by said predetermined coordinate system,
   said judging means making a decision, on the basis of said object map and said virtual space map, as to whether or not the collision between said object and said virtual space occurs.

9. An information processing system according to claim 1, further comprising processing means for conducting predetermined processing in accordance with a decision result by said judging means.

10. An information processing system according to claim 9, wherein, when the collision between said object and said virtual space occurs, said processing means issues information related to the collision therebetween.

11. An information processing system according to claim 9, wherein, when the collision between said object and said virtual space occurs, said processing means records said object.

12. An information processing method of processing three-dimensional information on an object existing in a three-dimensional space, said method comprising:
   a setting step of setting a predetermined virtual space in said three-dimensional space;
   a creating step of creating three-dimensional information on said object; and
   a judging step of making a decision, on the basis of said three-dimensional information on said object, as to whether or not a collision between said object and said virtual space occurs,
   wherein, in said setting step, a space having a predetermined configuration formed to enclose a predetermined space in said three-dimensional space and a predetermined width is set as said virtual space.

13. An information processing method according to claim 12, further comprising an operating step of inputting information needed for setting said virtual space, with in said setting step said virtual space being set on the basis of the input in said operating step.

14. An information processing system according to claim 12, wherein, in said setting step, a space enclosing a predetermined subject in said three-dimensional space but not including said subject is set as said virtual space.

15. An information processing method according to claim 12, wherein, in said setting step, a space varying in time series is set as said virtual space.

16. An information processing method according to claim 12, wherein, in said setting step, said virtual space is set on the basis of a plurality of images obtained by photographing said three-dimensional space.

17. An information processing method according to claim 12, wherein, in said creating step, said three-dimensional information is created on the basis of a plurality of images obtained by photographing said object.

18. An information processing method according to claim 12, further comprising:
   an object map drawing step of making out, on the basis of said three-dimensional information on said object, an object map indicating a position, at which said object exists in said three-dimensional space, by a predetermined coordinate system; and
   a virtual space map drawing step of making out a virtual space map indicating a position, at which said virtual space exists, by said predetermined coordinate system,
   said judging step making a decision, on the basis of said object map and said virtual space map, as to whether or not the collision between said object and said virtual space occurs.

19. An information processing method according to claim 12, further comprising a processing step of conducting predetermined processing in accordance with a decision result by said judging step.

20. An information processing method according to claim 19, wherein, when the collision between said object and said virtual space occurs, information related to the collision therebetween is issued in said processing step.

21. An information processing method according to claim 19, wherein, when the collision between said object and said virtual space occurs, said object is recorded in said processing means.

22. A supply medium for supplying control information which causes an information processing system to process three-dimensional information on an object existing in a three-dimensional space, said medium supplying:
   setting instruction for setting a predetermining virtual space in said three-dimensional space;
   a creating instruction for creating three-dimensional information on said object; and
   a judging instruction for making a decision, on the basis of said three-dimensional information on said object, as to whether or not a collision between said object and said virtual space occurs.
   wherein, by said setting instructions, a space having a predetermined configuration formed to enclose a predetermined space in said three-dimensional space and a predetermined width is set as said virtual space.

23. A supply medium according to claim 22, further supplying an operating instruction for inputting information needed for setting said virtual space, with said setting instruction sets said virtual space on the basis of the input by said operating instruction.

24. A supply medium according to claim 22, wherein, by said setting instruction, a space enclosing a predetermined subject in said three-dimensional space but not including said subject is set as said virtual space.

25. A supply medium according to claim 22, wherein, by said setting instruction, a space varying in time series is set as said virtual space.

26. A supply medium according to claim 22, wherein, by said setting instruction, said virtual space is set on the basis of a plurality of images obtained by photographing said three-dimensional space.

27. A supply medium according to claim 22, wherein, by said creating instruction, said three-dimensional information is created on the basis of a plurality of images obtained by photographing said object.

28. A supply medium according to claim 22, further supplying:

an object map drawing instruction for making out, on the basis of said three-dimensional information on said object, an object map indicating a position, at which said object exists in said three-dimensional space, by a predetermined coordinate system; and a virtual space map drawing instruction for making out a virtual space map indicating a position, at which said virtual space exists, by said predetermined coordinate system, and said judging instruction making a decision, on the basis of said object map and said virtual space map, as to whether or not the collision between said object and said virtual space occurs.

29. A supply medium according to claim 22, further supplying a processing instruction for conducting predetermined processing in accordance with a decision result by said judging step.

30. A supply medium according to claim 29, wherein, when the collision between said object and said virtual space occurs, information related to the collision therebetween is issued according to said processing instruction.

31. A supply medium according to claim 29, wherein, when the collision between said object and said virtual space occurs, said object is recorded according to said processing instruction.

* * * * *